United States Patent [19]
Mukainakano et al.

[11] Patent Number: 6,107,862
[45] Date of Patent: Aug. 22, 2000

[54] CHARGE PUMP CIRCUIT

[75] Inventors: Hiroshi Mukainakano; Kimio Shibata, both of Chiba, Japan

[73] Assignee: Seiko Instruments Inc., Japan

[21] Appl. No.: 08/807,237

[22] Filed: Feb. 28, 1997

[51] Int. Cl.[7] .................................................. G05F 1/10

[52] U.S. Cl. ...................................... 327/536; 363/60

[58] Field of Search ............................. 327/536, 538, 327/540; 307/110; 363/59, 60

[56]  References Cited

U.S. PATENT DOCUMENTS

| 4,999,761 | 3/1991 | Bingham et al. | 307/110 |
|---|---|---|---|
| 5,132,895 | 7/1992 | Kase | 363/60 |
| 5,642,073 | 6/1997 | Manning | 327/536 |
| 5,677,645 | 10/1997 | Merritt | 327/536 |

FOREIGN PATENT DOCUMENTS

| 585925 A2 | 3/1994 | European Pat. Off. . |
| 585925 A3 | 3/1994 | European Pat. Off. . |
| 2659507 | 9/1991 | France . |
| WO 97 23944 | 7/1997 | WIPO . |

OTHER PUBLICATIONS

Patent Abstracts of Japan, vol. 95, No. 3, Apr. 28, 1995.
Patent Abstracts of Japan, vol. 97, No. 2, Feb. 28, 1997.

*Primary Examiner*—Jung Ho Kim
*Attorney, Agent, or Firm*—Adams & Wilks

[57]  ABSTRACT

An improved charge pump circuit includes one switch element driven by a ramp waveform to precisely control the output voltage. The circuit includes a switch group having one or more switch elements for transferring a charge to one or more capacitors, a feedback circuit having an error amplifier for amplifying a difference between a divided output voltage and a reference voltage, a compensation circuit for phase compensating the feedback network, an oscillator for generating the ramp waveform, and a control circuit for driving the one or more switch elements. At least one of the switch elements has a resistance that can be adjusted externally and is driven by the ramp waveform such that its resistance varies with time. Accordingly, the charge transferred from a power source to the one or more capacitors can easily be adjusted. When the charge transferred is small, the on-time of the ramp waveform is short and the average value of the resistance is large. The average resistance of the switch group varies when the voltage of the power source varies, so that an output with a fixed voltage and low ripple voltage can be obtained.

12 Claims, 23 Drawing Sheets $$Ids = \frac{\mu \times Cox \times W}{L} \cdot \{(Vgs - Vt) - (Vds/2)\} \times Vds \cdot (1 + \lambda \times Vds) \quad \cdots (1)$$

$$Ron = \frac{1}{\frac{\partial Ids}{\partial Vds}} = \frac{L}{\mu \cdot Cox \cdot W \cdot (Vgs - Vt)} = \frac{L}{K \cdot W \cdot (Vgs - Vt)} \quad \cdots (3)$$

CHARGE PUMP CIRCUIT

The present invention relates to a PWM (pulse width modulation) charge pump circuit which outputs a converted power source voltage for driving a load.

BACKGROUND INFORMATION

In order to produce a regulated output voltage, two types of charge pump circuits have conventionally been employed. These charge pump circuits include the linear regulator type, which is capable of producing only a reduction in source voltage, and the switching mode type, which is capable of producing either a reduction or an increase in source voltage. However, each of these conventional charge pump circuits has various limitations. For example, while the ripple voltage is small in the linear regulator type charge pump circuit, the input/output efficiency is low since it can only be used to reduce a source voltage. In the switching mode type charge pump circuit, while either a reduction or an increase in source voltage is possible, a large ripple voltage is also produced. In addition, significant radio frequency noise is generated due to the switching operation. For this reason, efforts have been directed toward the realization of a charge pump circuit which can both increase and reduce a source voltage, which has a small ripple voltage, and which also has desirable radio frequency noise characteristics.

Various types of charge pump circuits have been designed to meet these goals. Such devices generally have capacitors arranged in a plurality of stages, and a switch group for driving the respective capacitors to transfer a charge from a voltage source to an output terminal in order to drive a load with a regulated voltage. For instance, each capacitor may be connected to a pair of switches for transferring charge to the capacitor from a previous stage of the circuit.

The charge pump circuit shown in schematic diagram form in FIG. 2 is one such type of charge pump circuit. This design is disclosed in Japanese Laid-Open Patent No. 63-157667 (U.S. Pat. No. 941,373), entitled "An integrated double load pump power source circuit including power-down characteristics and an RS-232 transmitter/receiver". In this circuit, the charge pump switch group comprises first through fourth switches (SW1–SW4) 101–104. When a first switch (SW1) 101 and a third switch (SW3) 103 are closed, and a second switch (SW2) 102 and a fourth switch (SW4) 104 are open, a charge is transferred to a pump capacitor (C1) 111 from an external power source ($V_{DD}$) 100. After an appropriate time period to achieve full charge transfer, the pump capacitor (C1) 111 is charged to the same voltage as that of the external power source ($V_{DD}$) 100. Thereafter, the second switch (SW2) 102 and the fourth switch (SW4) 104 are closed, the first switch (SW1) 101 and the third switch (SW3) 103 are opened, and the charge is transferred from the pump capacitor (C1) 111 to an output capacitor (C2) 112. After a sufficient time period to achieve charge transfer, the output capacitor (C2) 112 will also be charged to the same voltage as that of the external power source ($V_{DD}$) 100. Since the output capacitor (C2) 112 is connected in series with the pump capacitor (C1) 111, the voltage across output terminal 121 and ground terminal (GND) 120 is twice that of the external power source ($V_{DD}$) 100. As will be appreciated by those of ordinary skill in the art, by using the voltage of the output terminal 121 as the power source, fifth through eighth switches (SW5–SW8) 105–108 and third and fourth capacitors (C3, C4) 113, 114 may be driven in the same manner as described above to perform a similar voltage conversion. When this is done, the voltage of output terminal 122 becomes negative, and the absolute value of the voltage is twice that of the power source.

FIG. 3(A) is a block diagram of another type of charge pump circuit as disclosed, for example, in Japanese Laid-Open Patent No. 6351229 entitled, "A charge pump riser circuit with an output voltage stabilizer". In this circuit, the switches SW1–SW4 of the charge pump switch group comprise FETs (TR1–TR4) 101–104. A pulse generator 1 is used for generating a sawtooth waveform (shown as signal A in FIG. 3(B)) for driving the FETs 101–104. A resistor 2, and inverters 4, 5 convert the sawtooth waveform into pulses of the appropriate polarity for use as control signals. For example, the first transistor (TR1) 101 and third transistor (TR3) 103 are first turned ON to transfer charge from the voltage source ($V_{DD}$) 100 to the pump capacitor (C1) 111. The first transistor (TR1) 101 and the third transistor (TR3) 103 are then turned OFF and the second transistor (TR2) and the fourth transistor (TR4) 104 are turned ON. Charge is transferred to the output capacitor (C2) 112 to output a voltage having a magnitude of $2 \times V_{DD}$ at the output terminal ($V_{out}$) 122.

The charge pump circuit of FIG. 3(A) has a structure in which the output voltage is regulated by applying negative feedback from the output terminal ($V_{out}$) 122 to the third transistor (TR3) 103 which charges the pump capacitor (C1) 111. In particular, a feedback network is provided comprising a resistor divider having a first resistor R1 and a second resistor R2 for dividing the voltage applied at the output terminal ($V_{out}$) 122 and producing a divided output voltage, a reference voltage circuit 115 for generating a reference voltage ($V_{ref}$) 116, a comparator 117 for comparing the divided output voltage with the reference voltage ($V_{ref}$) 116, a third resistor R3 and a third capacitor C3 for converting the output current of the comparator 117 into a voltage, and a constant current source (ISRC).

As a result of the feedback, the ON time of the third transistor (TR3) 103 (the pulse width "PW" of signal D in FIG. 3(B)) varies, and it is thus possible to adjust the charging level of the pump capacitor (C1) 111 so that the average output voltage from the output terminal ($V_{out}$) 122 is a fixed voltage.

The charge pump circuits of FIGS. 2 and 3(A) have various shortcomings. For example, if the external power source voltage for the charge pump circuit of FIG. 2 is $V_{DD}$, the output voltage is $2 \times V_{DD}$ and $-2 \times V_{DD}$. While the output voltage may be increased by connecting a plurality of charge pump circuits in multiple stages (i.e., n stages), the output voltage is n times the voltage of the power source (n being the integer number of voltage increasing stages of the charge pump circuit). The output of this charge pump circuit is therefore limited to an integer multiple of the output voltage $V_{DD}$ of the external source.

For this reason, when the voltage of the power source ($V_{DD}$) 100 changes, the output voltage also changes simultaneously. Consider a charge pump circuit having an output voltage that is twice the voltage of the power source. If three Ni-Cd (Nickel-Cadmium) batteries are connected in series with the power source, at the initial stage the voltage of one battery is initially 1.3 V and the total voltage is initially 3.9 V, so the output voltage is initially 7.8 V. However, when the voltage of the battery falls to 0.9 V, the output voltage of such a charge pump circuit will fall to 5.4 V. If a power source in which voltage falls with a reduction in the current (such as a battery) is used with this kind of charge pump circuit, the output voltage will also gradually decay. There is always a restriction on the range of voltage within which electronic components (ICs and the like) driven by a charge pump circuit as a power source can operate properly. If there is a large variation in the output voltage of the charge pump circuit, there is a possibility that it will go outside the voltage range for proper operation of the IC, preventing it from working properly and causing instability.

The charge pump circuit shown in FIG. 3(A) was designed to overcome this problem. In this circuit, the charge level of the pump capacitor (C1) 111 is adjusted using the value of the output voltage $V_{out}$, so that the output voltage is stabilized and the above-mentioned problem is resolved. There are two methods of adjusting the output voltage, involving either varying the ON-time of the third transistor (TR3) 103 or varying the resistance of the third transistor (TR3) 103 when it is ON. These methods employ PWM (pulse width modulation) technology and carry out a fixed cycle of switching, achieving a small ripple voltage.

In order to adjust the charging of the pump capacitor (C1) 111 to control the output voltage at an output terminal ($V_{out}$) 122, the gate pulse width ON-time applied to the third transistor (TR3) 103 is controlled using the charge pump circuit shown in FIG. 3(A). However, when the present inventors conducted a precise analysis in simulation, it was found that it was extremely difficult from a technical standpoint to adjust the output voltage using this circuit. The circuit and waveforms used by the inventors in the simulation are shown in FIGS. 4(A) and 4(B), and the conditions were as follows:

Condition 1 (constant for all parts)

VDD (voltage of power source)=5.0 V, f (oscillation frequency)=50 kHz

C1 (pump capacitor)=1 μF, C2 (output capacitor)=10 μF

RSW1 (resistance when TR1 is ON)=RSW2 (resistance when TR2 is ON)=2 Ω

RSW3 (resistance when TR3 is ON)=RSW4 (resistance when TR4 is ON)=2 Ω

$I_{out}$ (output current)=10 mA

* There is no delay on the output of the inverter which drives switches SW1–SW4.

FIG. 5 shows the relationship between output voltage and pulse width found from the simulation conducted under Condition 1. The maximum output voltage was achieved where there was no feedback current drawn from the output terminal and its value was 2 times $V_{DD}$=10 V. When current was drawn from the output terminal, the output voltage was reduced. In order to further reduce the output voltage, the pulse width (hereinafter abbreviated as PW) is shortened. However, as can be seen in FIG. 5, the relationship between output voltage and PW is not proportional, and it is extremely difficult to control output voltage at low voltages.

For example, when the output voltage ($V_{out}$) is set at 9.5 V, PW equals 2.1 μs. When $V_{out}$ equals 9.0 V, PW equals 0.9 μs. In other words, in order to vary an output voltage of 9.5 V by 0.5 V, the length of PW must be varied by approximately 1.2 μs.

When the output voltage is lower than that above, such as 7.0 V, PW=0.28 μs. When the output voltage is set at 6.0 V, PW=0.21 μs. This means that the pulse width is significantly shorter than 1 μs. In varying the output voltage from 7.0 V to 6.0 V, the length of the pulse width varies only by approximately 0.07 μs. Thus, the output voltage can be varied by 1 V by a pulse width as short as 70 ns.

Since the circuit has these characteristics, there are various technical problems encountered in adjusting the output voltage of the circuit in FIG. 3(A). One of these problems is in the switch drive circuit (oscillator). When the output voltage is low, adjustment of the pulse width must be carried out on the level of a few nanoseconds. If a relatively long time is required for the start up and decay of the pulse, it is impossible to adjust the output voltage under these conditions. Start-up and decay time must therefore be kept at less than ins. However, in order for a start-up time of less than ins to be achieved, the switches, oscillators, inverters, comparators and other parts required for the charge pump circuit must all be capable of operating at an extremely high speed. Such high speed elements consume a great deal of current, are difficult to manufacture and are expensive.

Moreover, when using batteries with a high internal impedance as a power source, the fluctuation in voltage of the power source is large due to the high consumption current. Thus, control is even more difficult since the start-up time for the control clock and the pulse width are affected by fluctuations in the power source. Furthermore, since the consumption current is extremely large, the input/output efficiency also falls. When using this kind of battery as a power source, it is very difficult to stabilize the output voltage. Since the input/output conversion efficiency is also extremely low, it is difficult to use with portable equipment.

Thus while it is theoretically possible to adjust the output voltage using the charge pump circuit of FIG. 3(A), the circuit must be controlled at a very high speed, and little effect is seen in terms of stabilizing the output voltage.

Another charge pump circuit designed to alleviate the above-described problems is shown in FIG. 6. By controlling the gate pulse voltage applied to the third transistor (TR3) 103, the resistance when the third transistor (TR3) 103 is ON can be adjusted. However, when the inventors analyzed this circuit in a simulation, it was found that it was very difficult from a technical standpoint to maintain a fixed output voltage using this method.

The circuit and waveforms used in this simulation are shown in FIGS. 7(A) and 7(B). A variable resistor (RSW3) 118 was connected in series with the third switch (SW3) 103 in order to vary the resistance of the third switch (SW3) 103 to form an equivalent circuit.

The operating conditions for each component were as follows:

Condition 2 (constant for all Parts)

VDD(voltage of power source)=5.0 v, f (oscillation frequency)=50 kHz

C1 (pump capacitor)=1 μF, C2 (output capacitor)=10 μF

RSW1 (resistance when TR1 is ON)=2 Ω

RSW2 (resistance when TR2 is ON)=RSW4 (resistance when TR4 is ON)=2 Ω

RSW3 (resistance when TR3 is ON)=2–300 Ω

$I_{out}$ (output current)=10 mA

* There is no delay on the output of the inverter which drives switches SW1–SW4.

FIG. 8 shows the relationship between the resistance of the third switch (RSW3) 118 and the output voltage found from the simulation conducted under Condition 2, with output current $I_{out}$ as the parameter. As is clear from FIG. 8, since the output voltage and the resistance of the third switch (RSW3) 118 have a proportional relationship, it is easier to control the output voltage than in the charge pump circuit of FIG. 3(A). For example, in order to change $V_{out}$ from 5 V–9.8 V at $I_{out}$=10 mA, it will be sufficient to vary RSW3 over the range 2–24 Ω. However, since the charge is supplied to the pump capacitor (C1) 111 via a resistance, electrical power is consumed unnecessarily in the resistance and the efficiency of the input/output conversion is thus reduced.

Additional problems occur when the output current is large. Under the condition $I_{out}=100$ mA, RSW3 must be varied over the range 2–17 Ω in order to vary $V_{out}$ over the range 5 V–7.7 V. Although an FET is used as the third switch (SW3) 103 in the charge pump circuit of FIG. 6, in order to keep this at the resistance value described above, the gate voltage must be adjusted. Even with compensation for variations in the manufacture of the FET, an extremely complicated circuit is required to adjust the value of this resistance. In other words, the higher the output current, the more difficult it is to adjust the output voltage. Thus, the device becomes more expensive and the circuit becomes more complicated. In addition, the consumption current also increases due to the high speed operation required.

When the output voltage is low, the input/output efficiency is poor. On the other hand, when the output current is high, a complicated circuit is required for adjustment. As a result, the charge pump circuit of FIG. 6 has little effect on the stabilization of output voltage.

FIG. 9 shows another type of charge pump circuit intended to eliminate the foregoing problems. This charge pump switch group is identical to that shown in FIG. 3(A). In this circuit, however, first and second pulse generators are used to drive OR gates for providing control signals to the charge pump switch group. The feedback loop includes a resistor divider having a first resistor R1 and a second resistor R2 for dividing the output voltage of the charge pump circuit and producing a divided output voltage, a reference voltage circuit 115 for generating a reference voltage, and a comparator 117 for comparing the reference voltage and the divided output voltage. With the method of control utilized in this circuit, the output voltage of the charge pump circuit is held at a fixed value by intermittently switching the charge pump circuit ON and OFF. Switching is carried out using the comparator 117 and OR gates. The comparator compares the divided output voltage with a reference voltage, and turns off the charge pump switch group when the divided output voltage exceeds the reference voltage. The switching characteristic is such that it does not affect the input/output conversion efficiency. This method of control, known as PFM (pulse frequency modulation), has a drawback in that it includes a ripple in the output voltage caused by fluctuation of the switching frequency. It is not easy to remove this ripple.

SUMMARY OF THE INVENTION

In view of the above-described drawbacks of the known charge pump circuits, an object of the present invention is to provide a PWM type charge pump circuit which has a fixed output voltage and a high input/output conversion efficiency, which is easy to control, and which has a simple construction using a switching system that ensures a small ripple voltage even if the voltage of the power source varies significantly.

In order to solve the above-described problems of the known charge pump circuits, an improved charge pump circuit is provided in the present invention. The charge pump circuit is of the type utilizing negative feedback for supplying a divided output voltage to a charge pump switch group in order to regulate the output voltage. The charge pump circuit comprises a charge pump switch group having one or more first switch elements for selectively transferring an input charge to one or more first capacitors, and one or more second switch elements for transferring charge from the one or more first capacitors to one or more second capacitors. The circuit has a feedback path comprising a reference voltage circuit for generating a reference voltage, an error amplifier for amplifying a difference between a divided output voltage and the reference voltage, a phase characteristic compensation circuit for phase compensating the feedback network, an oscillator for generating a ramp waveform, and a control circuit for driving the one or more first and second switch elements. At least one of the switch elements for transferring charge to the one or more first or second capacitors comprises a device, such as a transistor, having an ON resistance that can be adjusted externally and is driven by the ramp waveform such that its resistance varies with time.

By this structure, the charge transferred from a power source to the one or more first capacitors or the charge transferred to the one or more second capacitors from the one or more first capacitors can easily be adjusted. When the charge transferred is small, the on-time of the ramp waveform is short and the average value of the ON resistance is large.

Since the feedback network adjusts the on-time of the variable resistance switch element using a ramp waveform, it has a structure in which the average resistance value of the switch circuit can be easily varied even when the voltage of the power source fluctuates greatly.

In a charge pump circuit having the above-described structure, operation proceeds such that the average resistance of the switch circuit varies when the voltage of the power source varies, so that an output with a fixed voltage and low ripple voltage can be obtained. Moreover, the control circuit is simple and inexpensive to manufacture, and it is therefore possible to supply the device at a low cost. Furthermore, the charge pump circuit of the present invention has desirably low electromagnetic radiation (radio frequency noise) characteristics, low current consumption, and high input/output conversion efficiency. Since it can be easily used to create a monolithic IC, the charge pump circuit of the present invention is suitable for application in portable electronic equipment.

DETAILED DESCRIPTION OF THE PREFERRED EMBODIMENTS

Figure 1:
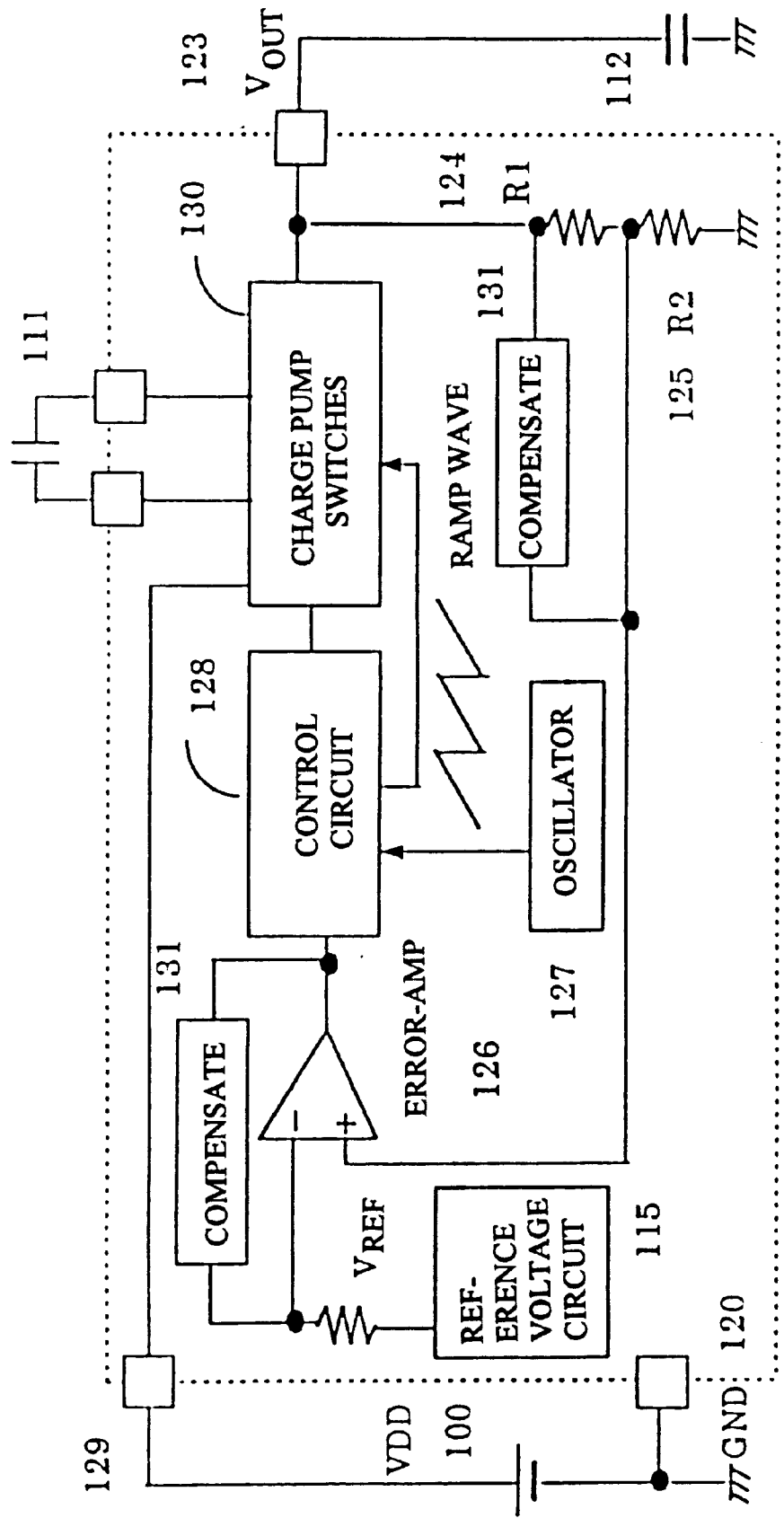
FIG. 1 is a block diagram of a charge pump circuit in accordance with a first embodiment of the present invention.
Figure 2:
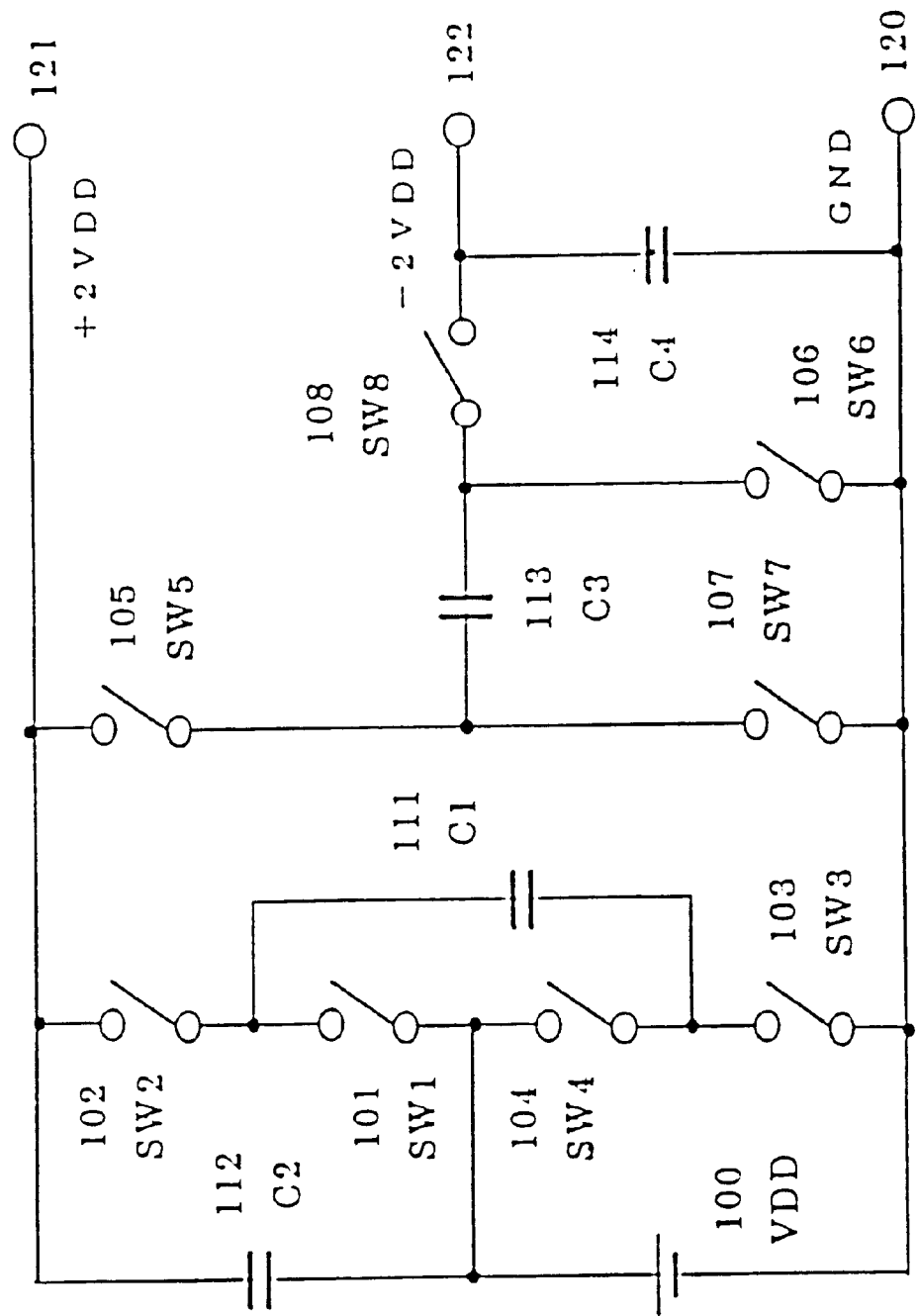
FIG. 2 is a schematic diagram of a charge pump circuit used to explain the drawbacks of the prior art.
Figure 3A:
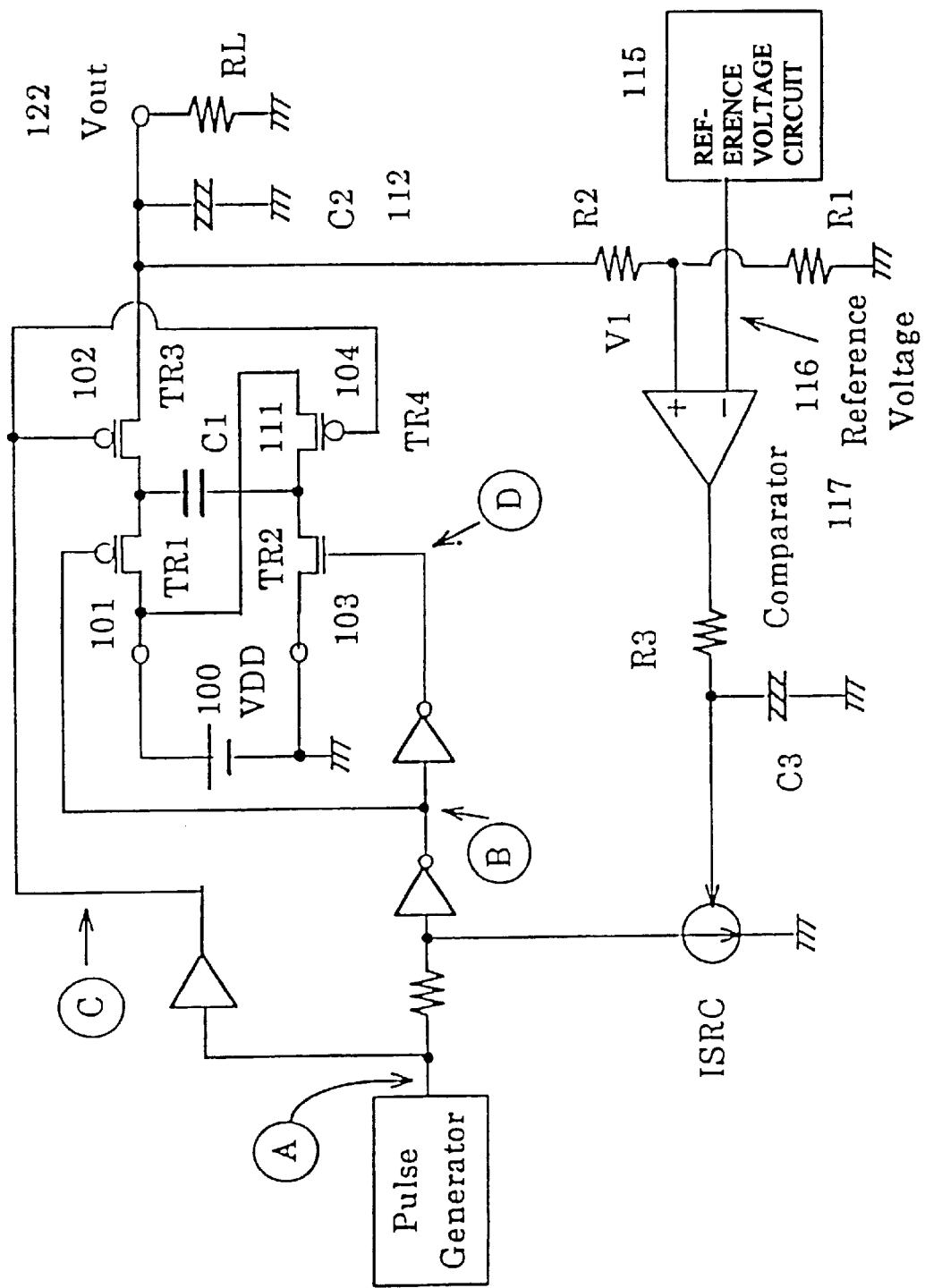
FIG. 3(A) is a schematic diagram of another charge pump circuit used to explain the drawbacks of the prior art.
Figure 3B:
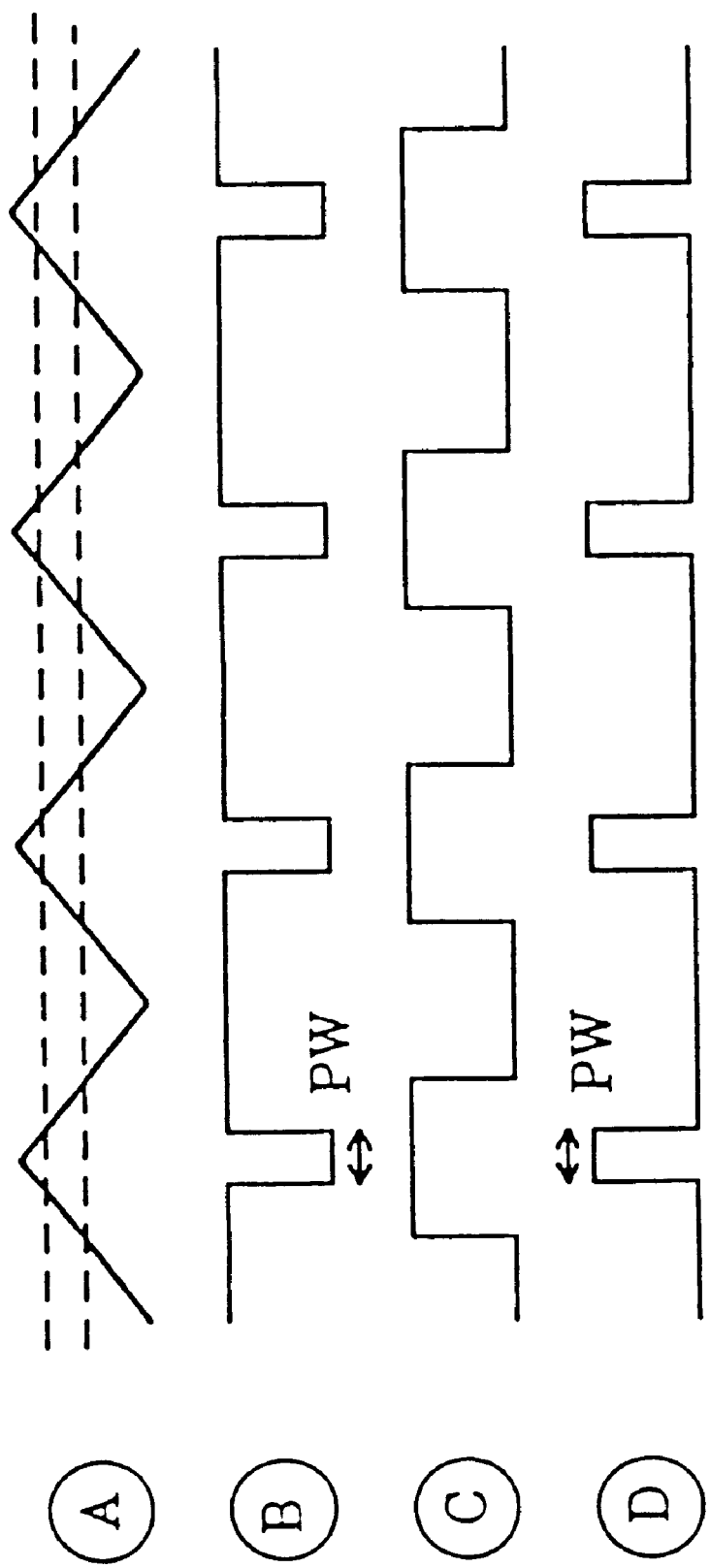
FIG. 3(B) is a graphical representation of waveforms appearing at various portions of the charge pump circuit of FIG. 3(A)
Figure 4A:
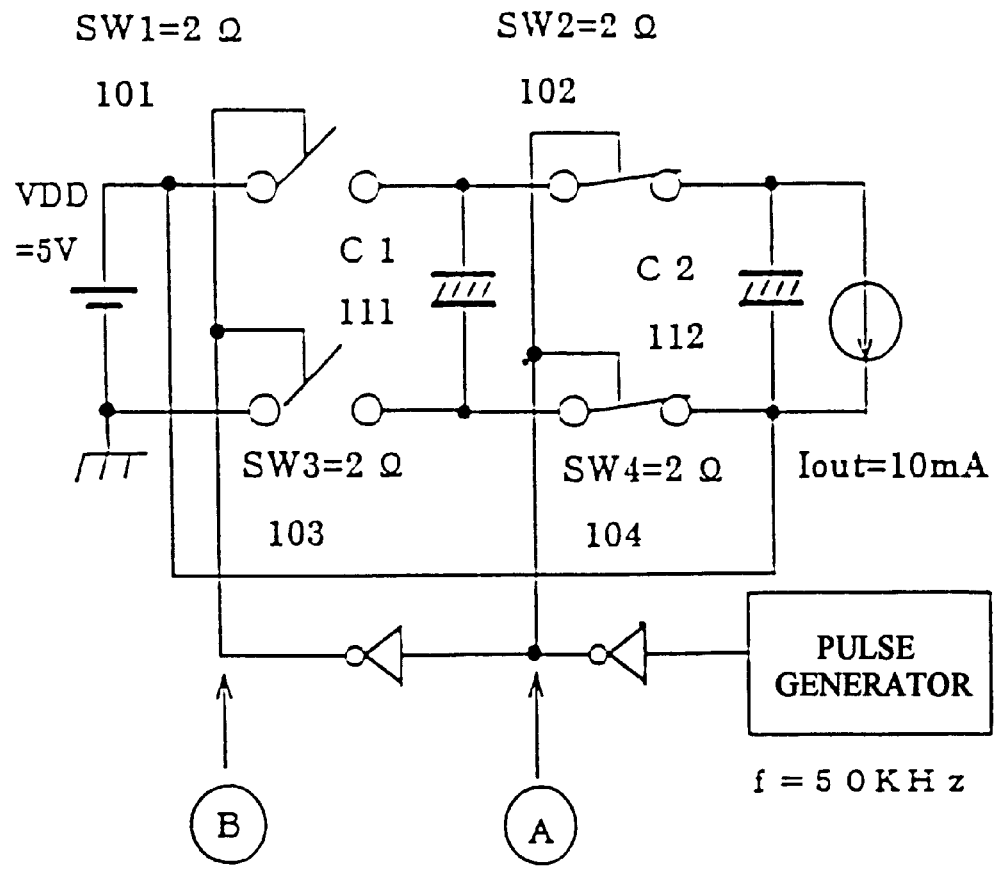
FIG. 4(4) is a schematic diagram of a simulation circuit used for analysis of the charge pump circuit of FIG. 3(A)
FIG. 4(B) is a graphical representation of waveforms appearing at various portions of the simulation circuit of FIG. 4(A)
Figure 4B:
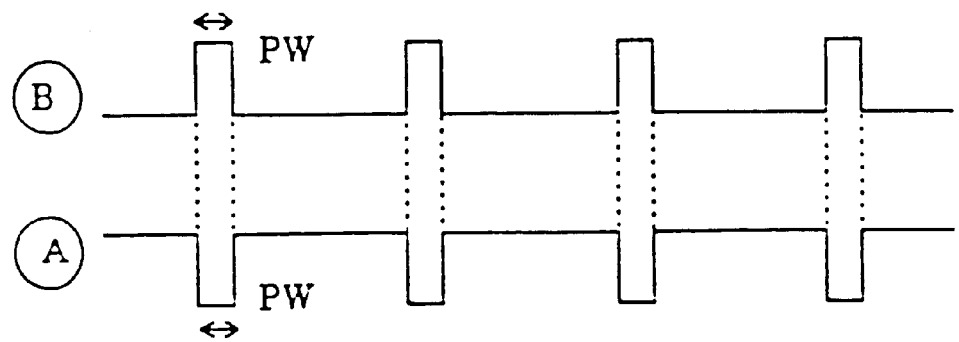

Various preferred embodiments of the charge pump circuit of the present invention will now be described with reference to the attached drawings, in which like parts are labeled with like reference numerals. The constituent parts of the invention will be described first.

FIG. 1 is a block diagram of a first embodiment of the charge pump circuit of the present invention. This circuit comprises a group of charge pump switches 130 having a plurality of switching elements, and which may also have built-in capacitors for the transfer and storage of electric charge, a resistor divider comprising a first resistor (R1) 124 and a second resistor (R2) 125 for dividing the output voltage of charge pump switch group 130, an error amplifier 126 for amplifying the difference between the divided output voltage and a reference voltage, first and second gain and phase characteristic compensation circuits 131, 132 for stabilizing the feedback circuit network, a control circuit 128 for supplying the charge pump switch group 130 directly or indirectly with the output voltage or current of the error amplifier 126 as ON/OFF control signals, and an oscillator 127.

In this embodiment, the charge pump circuit is shown within the broken lines in FIG. 1. The component parts of the design described above can all be built into a single monolithic IC chip. As will be appreciated by those of ordinary skill in the art, by combining the various parts for the error amplifier, resistors, capacitors, and the like, it is also possible to create a so-called "hybrid" IC. In the embodiment shown in FIG. 1, a pump capacitor (C1) 111 and an output capacitor (C2) 112 are connected externally to the charge pump circuit. Generally, the pump capacitor (C1) 111 and output capacitor (C2) 112 require a large capacitance value due to various operating conditions, such as the magnitude of the current consumed by the load and the operating frequency. These capacitors are provided externally since it is difficult to form an integrated circuit on a single chip with a large capacitance of 10 µf, for example. However where output current is not particularly important, or where the oscillation frequency can be set to a high value, it is possible to build the pump capacitor (C1) 111 and output capacitor (C2) 112 into the IC.

The reference voltage circuit 115 produces a fixed voltage $V_{ref}$ even if the voltage of the power source varies. This may be of the type known, for example, as the band-gap reference voltage circuit or the like. The power source for the reference voltage circuit 115 may be an external power source ($V_{DD}$) 100, or depending on the circuit design, it may be the output voltage $V_{out}$ at output terminal 123. In either case, a higher voltage than the reference voltage $V_{ref}$ is necessary.

The oscillator 127 supplies a waveform at a fixed frequency to the control circuit 128 even if the voltage of the power source fluctuates. For the oscillation circuit 127, it is possible to use a ring oscillator circuit, a non-stable multivibrator circuit, a blocking oscillator circuit or the like, all of which are known in the prior art and will not be described in detail herein. The power source of the oscillation circuit 127 may be the external power source ($V_{DD}$) 100, similar to that as used for the reference voltage circuit 115, or, depending on the design of the circuit, it may be the output voltage $V_{out}$ at output terminal 123. Depending on the output current and the pump capacitor conditions, the oscillator 127 may be arranged so that the oscillation frequency can be adjusted using an externally supplied voltage or the value of an externally connected capacitor.

The error amplifier 126 has a negative input terminal which receives the reference voltage signal $V_{ref}$, a positive input terminal which receives the divided output voltage of the charge pump switch group 130, and an output terminal which outputs an added signal. The error amplifier 126 amplifies or attenuates the difference between the divided output voltage and $V_{ref}$. The first and second gain and phase compensation circuits 131, 132 may be replaced by a device fitted with an operational amplifier. In the embodiment of FIG. 1, while the first gain and phase compensation circuit 131 is connected for convenience to the output of the error amplifier 126 and to the inverted input terminal, it will be obvious to those of ordinary skill in the art that the error amplifier 126 and first gain and phase compensation circuit 131 can be formed by a feedback configuration other than this.

Gain and phase compensation is not only used to compensate for the phase delay of the error amplifier 126. In the embodiment shown in FIG. 1, a second gain and phase compensation circuit 132 is also connected to the first resistor (R1) 124. In this manner, the first and second gain and phase compensation circuits 131, 132 are used to stabilize the entire feedback network of the charge pump circuit.

The external power source voltage ($V_{DD}$) 100 is inserted between the external power source input terminal 129 and the ground terminal (GND) 120. The external power source voltage ($V_{DD}$) 100 is also connected to at least the charge pump switch group 130.

Figure 10:
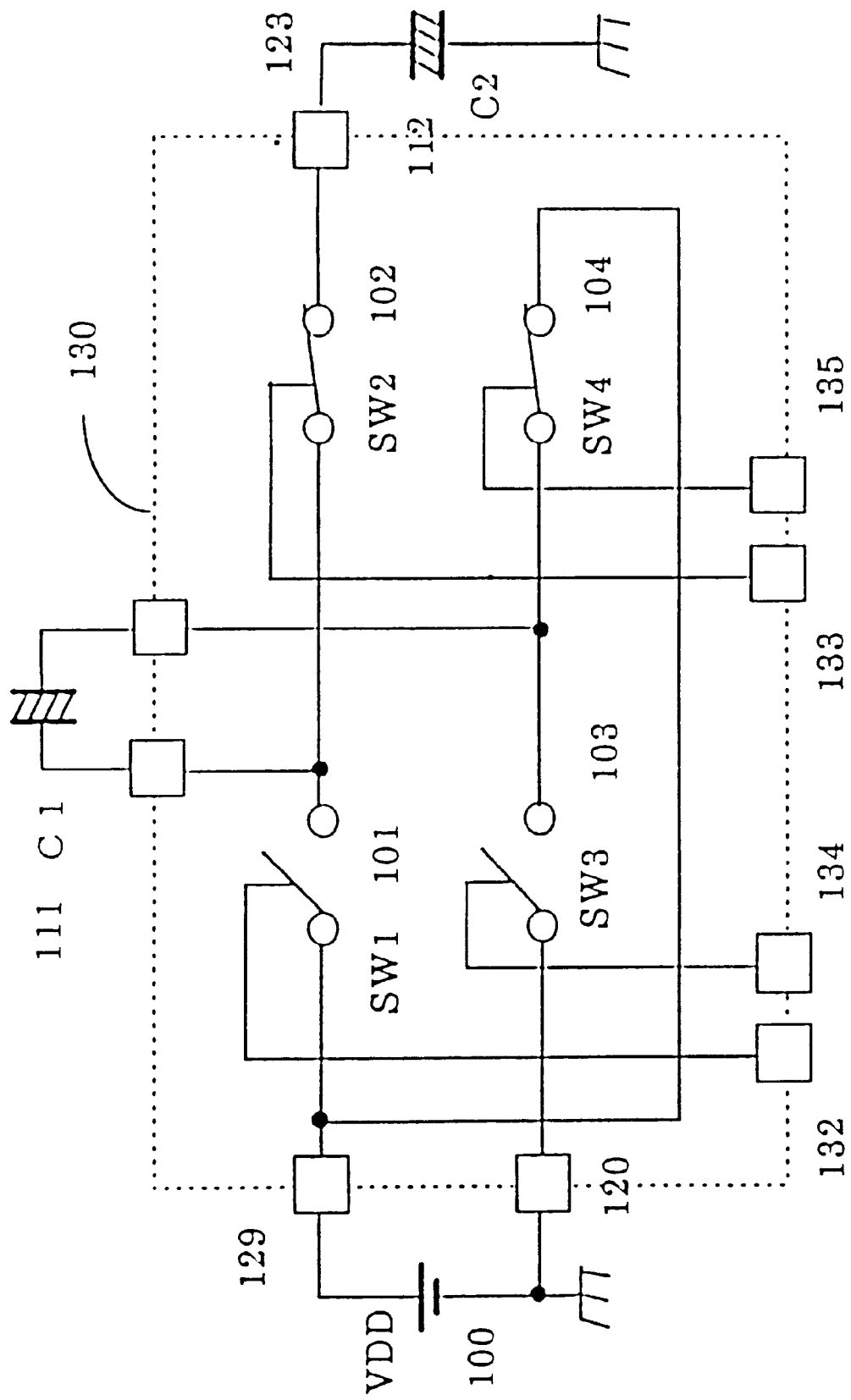
FIG. 10 is a schematic diagram of one embodiment of the charge pump switch group used in the charge pump circuit of the present invention.

Referring to FIG. 10, the charge pump switch group 130 will now be explained. In this figure, the parts surrounded by a dotted line comprise the charge pump switch group 130. In the embodiment of FIG. 10, there are four switches (SW1–SW4) 101–104, each of the switches having a control terminal 133, 134, 135, and 136, respectively, for receiving an ON/OFF control signal from the control circuit 128. The external power source ($V_{DD}$) 100 is connected to the charge pump switch group 130 via first and second terminals 120, 129. The charge applied from the external power source ($V_{DD}$) 100 via first and third switches (SW1) 101 and (SW3) 103 is transferred to the pump capacitor (C1) 111, and the charge is thereafter transferred to the output capacitor (C2) 112 from the pump capacitor (C1) 111 via the second switch (SW2) 102 and the fourth switch (SW4) 104. The transfer of charge is carried out independently for each switch, and by repetition of this operation it is possible to indirectly supply current from the power source ($V_{DD}$) 100 to the output terminals. In other words, the charge is not directly transferred to the output capacitor 112 from the external power source 100. With the circuit of FIG. 10, the maximum output voltage extracted from $V_{out}$, at the output terminal 123, is twice that of the external power source ($V_{DD}$) 100.

Figure 11:
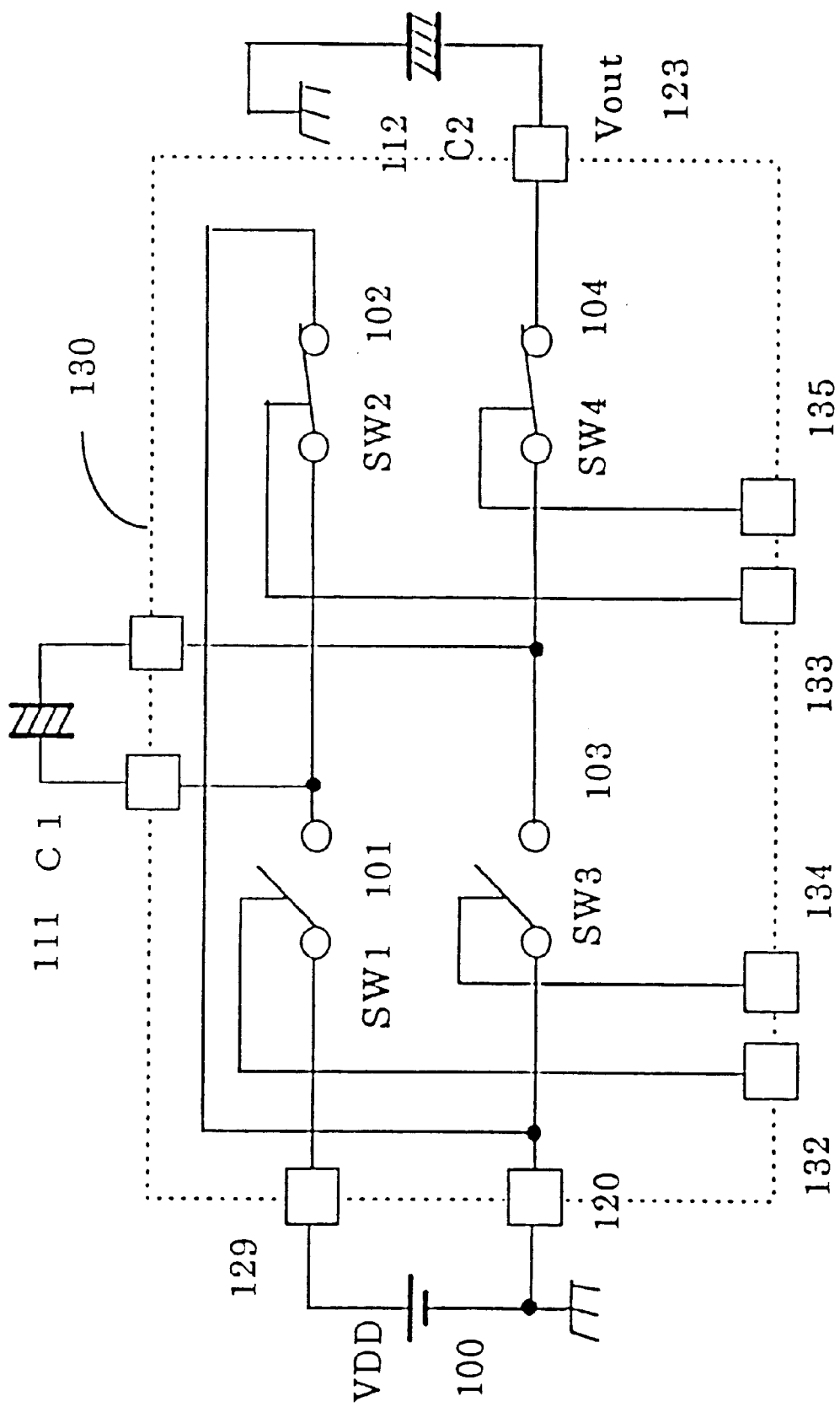
FIG. 11 is a schematic diagram of another embodiment of the charge pump stitch group used in the charge pump circuit of the present invention.

The design of the switch group 130 is not limited to the configuration shown in FIG. 10. In this regard, FIG. 11 shows another embodiment of the switch group. In this embodiment, switches having ON/OFF signal input/output terminals are used in the same way as in the embodiment shown in FIG. 10, but there are changes in the position at which the output terminal 123 is located and in the wiring connections. The charge is transferred to the pump capacitor (C1) 111 from the external power source ($V_{DD}$) 100, and thereafter the repeated operation of the transfer of charge from the pump capacitor (C1) 111 to the output capacitor (C2) 112 is exactly the same as the embodiment in FIG. 10. However, in the charge pump switching group 130 of FIG. 11, the voltage appearing at output capacitor (C2) 112 is negative, and the maximum output voltage is $-2 \times V_{DD}$. In this manner, it is possible to vary the output voltage depending on the type of connections existing between the switch group 130, the pump capacitor (C1) 111 and the output capacitor (C2) 112.

Figure 12:
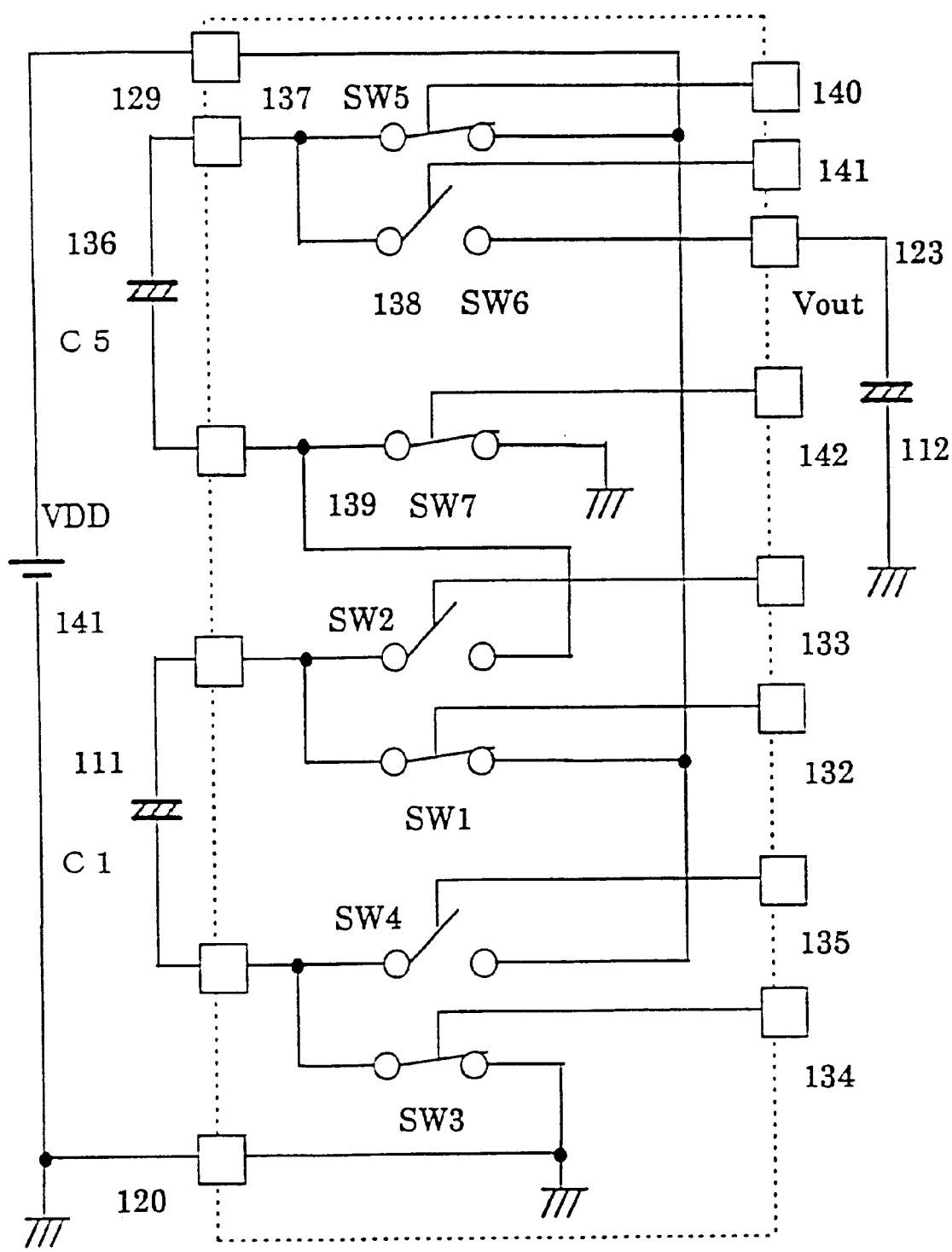
FIG. 12 is a schematic diagram of yet another embodiment of the charge pump switch group used in the charge pump circuit of the present invention.

Furthermore, the number of switches is not limited to four, as in the above-described switch groups. FIG. 12 shows an embodiment in which three additional switches (SW5, SW6,SW7) 137, 138, 139 having control terminals 140, 141, and 142, respectively, are added to the embodiment of FIG. 10. The difference between the FIG. 12 and FIG. 10 embodiments is that in FIG. 12 the charge is simultaneously transferred from the external power source ($V_{DD}$) 100 to the pump capacitor (C1) 111 and a second pump capacitor (C5) 150. A fifth switch (SW5) 137 and a seventh switch (SW7) 139 control the charging of the second pump capacitor (C5) 150. At this time, the first, third, fifth and seventh switches (SW1,SW3,SW5,SW7) 101,103,137,139 are closed, and the second, fourth and sixth switches (SW2,SW4,SW6) 102, 104,138 are open. When the charging of the pump capacitors is completed, the second, fourth and sixth switches (SW2, SW4,SW6) 102,104,138 are closed and first, third, fifth and seventh switches (SW1,SW3,SW5,SW7) 101,103,137,139 are opened. The first pump capacitor (C1) 111 is connected in series with external power source input terminal 129, and in addition charged pump capacitor (C5) 150 is also connected in series. Repetition of the above-described series of operations results in a maximum output voltage $V_{out}$, from output terminal 123, of $3 \times V_{DD}$.

In this manner, the maximum output voltage can be varied by an integer multiple of the voltage of the power source, and the characteristics can also be varied by varying the number of switches and pump capacitors, by changing the connections between elements, and/or by varying the switch timing. Since the methods and circuits for accomplishing this are well known, a detailed description of the respective circuits will be omitted here. The charge pump switch group of the invention comprises a plurality of switches wired together, with external or built-in pump capacitors and output capacitors being connected thereto, the device having a function whereby the plurality of switches can be controlled by means of external signals.

Figure 13:
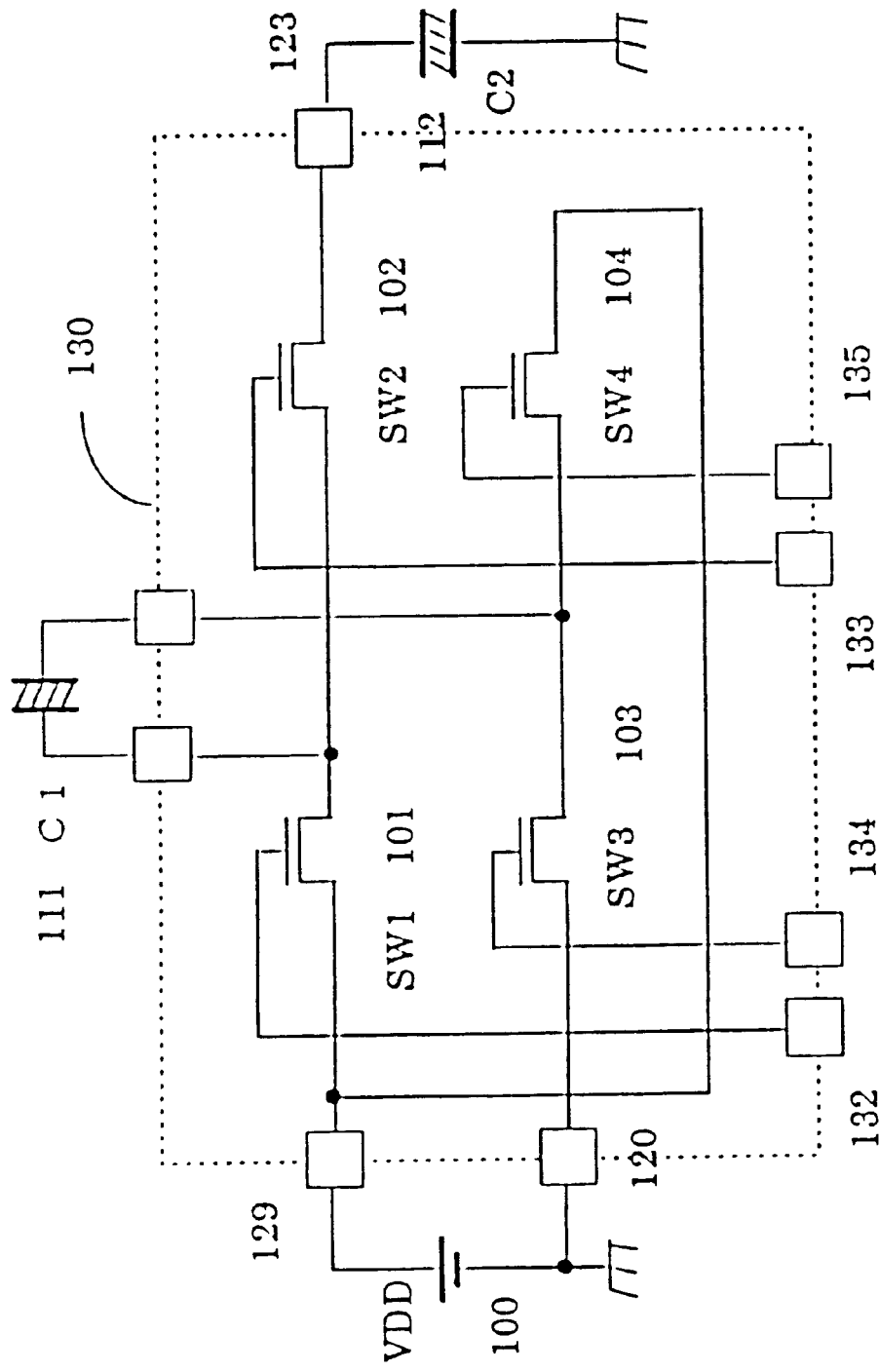
FIG. 13 is a schematic diagram of another embodiment of the charge pump switch group used in the charge pump circuit of the present invention, which is the same as that shown in FIG. 10 with a FET being substituted for each of the switches.

Furthermore, since transistors such as MOSFETs have a variable ON resistance depending on the gate voltage, one or more of the switches of the embodiments described thus far can be replaced by an FET. This is shown in FIG. 13, in which first through fourth switches (SW1–SW4) 101–104 of the FIG. 10 embodiment have been replaced by FETs.

It is also possible to replace the switch elements with bipolar transistors, in which case it will be possible to vary the resistance using base current $I_b$. In the detailed description of the present invention, however, only embodiments using MOS transistors as switching elements will be described for ease of understanding. Moreover, while MOS transistors include PMOS transistors and NMOS transistors, so long as the ON resistance can be varied using the voltage $V_{gs}$ between the gate and source, either of these types may be used.

The operation of the device will now be described.

Figure 14A:
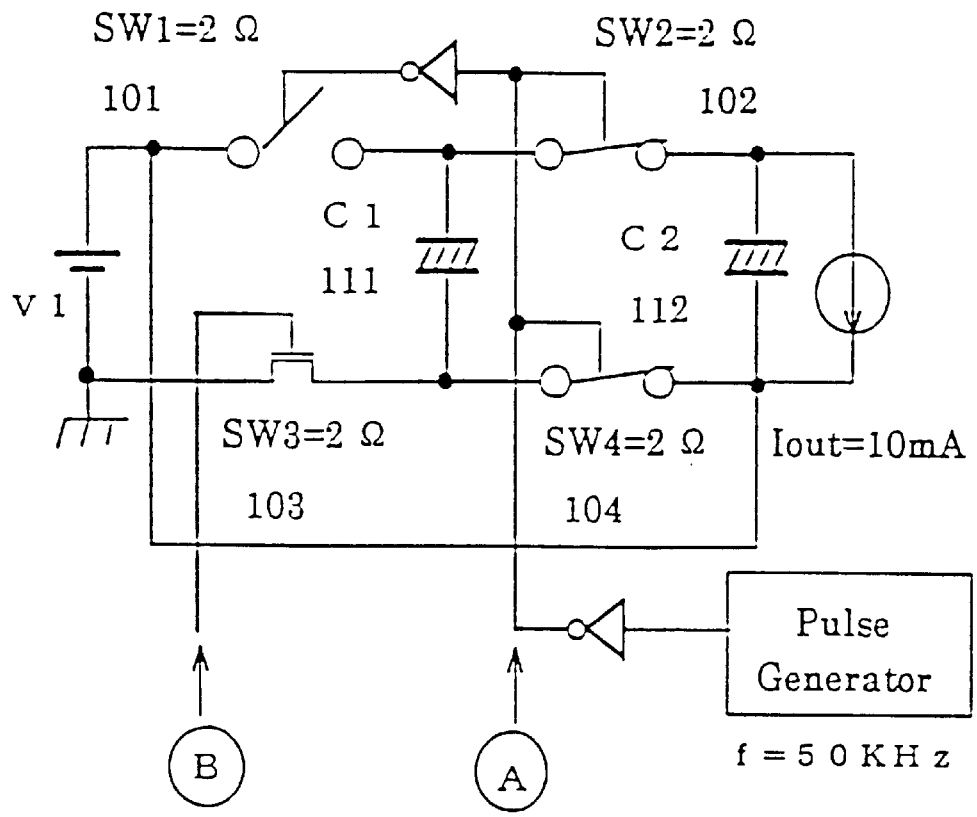
FIG. 14(A) is a schematic diagram showing a portion of the charge pump circuit of the first embodiment.
Figure 14B:
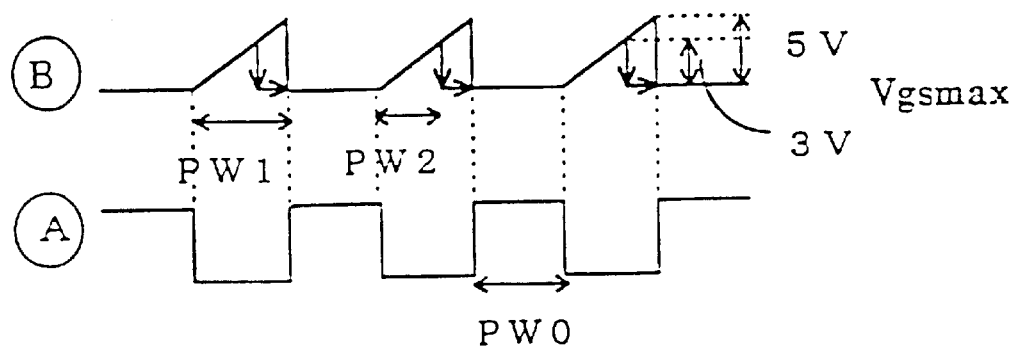
FIG. 14(B) is a graphical representation of waveforms appearing at various portions of the circuit of FIG. 14(A)

FIG. 14(B) shows the voltage waveforms applied to the ON/OFF control terminal for the switches in the charge pump switch group shown in FIG. 14(A) and described above. These waveforms are formed in control circuit 128 shown in FIG. 1. As shown in FIG. 14(B), a ramp waveform (sawtooth) is applied to the third switch (SW3) 103, with a rectangular waveform being applied to the first switch (SW1) 101, the second switch (SW2) 102 and the fourth switch (SW4) 104. In the circuit of FIG. 14(A), the charge pump operation proceeds as described above in connection with the charge pump circuit of FIG. 10. In the circuit of FIG. 14(A), the maximum output voltage is twice the input voltage.

For this circuit, the operating conditions are determined as follows:

Condition 3 (constant for all parts)
  VDD (voltage of power source)=5.0 v, f (oscillation frequency)=50 kHz
  Length of PW0 is fixed (PW0 is 1/(f * 2).)
  C1 (pump capacitor)=1 µF, C2 (output capacitor)=10 µF
  Ramp waveform driven by a voltage of 0–5 volts.
  RSW1 (resistance when TR1 is ON)=RSW2 (resistance when TR2 is ON)=2 Ω

RSW3 (resistance when TR3 is ON)=RSW4 (resistance when TR4 is ON)=2 Ω

* Resistance when ON is the resistance when gate-source voltage is 5 V (max)

$I_{out}$ (output current)=10 mA

In this embodiment, the output voltage is adjusted by varying the pulse width of the ramp waveform applied to the third switch (SW3) 103 (when the third switch (SW3) 103 is ON). The period over which voltage is applied to the third switch (SW3) 103 for the longest time is the period PW1, and the maximum voltage of the ramp waveform is 5 V. At this time, the charge transferred from the power source to the pump capacitor (C1) 111 is also at a maximum, so that the output voltage is at a maximum as well. In order to adjust the output voltage, a smaller ramp waveform as shown by the arrows indicated in FIG. 14(B) is used. In other words, the period during which voltage is applied to the third switch (SW3) 103 (the conducting time) is PW2, which is shorter than PW1, and the maximum voltage of the ramp waveform is only at 3 V.

In order to vary the output voltage in this manner, it is necessary to vary both the pulse width and maximum voltage of the ramp waveform. When the pulse width is short and the maximum voltage is low, the result is that the output voltage decreases. As will be explained in greater detail below, the pulse waveform is not limited to the sawtooth waveform shown in FIG. 14(B).

A detailed description will now be given of the efficacy of this method in varying the output voltage.

Figure 15:
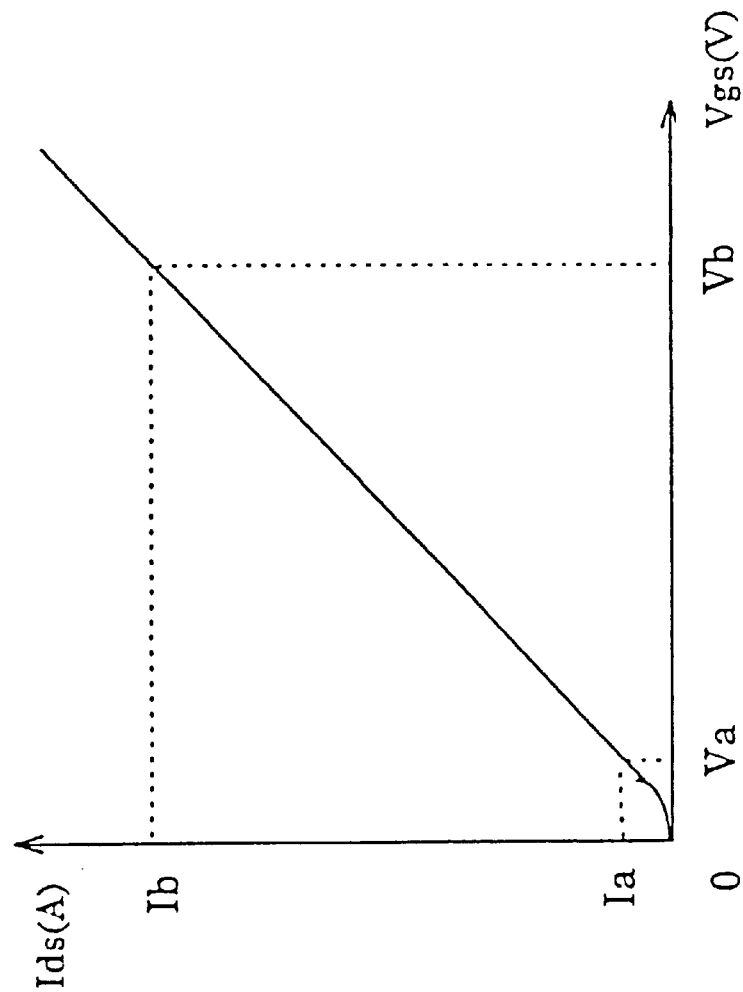
FIG. 15 is a graphical representation of the $V_{gs}$–$I_{ds}$ characteristics of a MOS transistor.

In general, MOSFETs have the $V_{gs}$ (gate source voltage) and $I_{ds}$ (drain source current) characteristics shown in FIG. 15. Under non-saturated conditions ($V_{ds} < V_{gs} - V_t$), $I_{ds}$ is given by Equation (1):

$$Ids = \frac{\mu \times Cox \times W}{L} \cdot \{(Vgs - Vt) - (Vds/2)\} \times Vds \cdot (1 + \lambda \times Vds) \quad (1)$$

wherein $\mu$ is the carrier mobility, $C_{ox}$ is the capacitance per unit area, W is the effective channel width of the FET, L is the actual channel length, $V_t$ is the threshold value voltage of the FET, and $\lambda$ is the channel length modulation parameter.

If $V_{ds}$ is made small, Equation (1) may be approximated by the following Equation (2):

$$Ids = \frac{\mu \times Cox \times W}{L} \cdot (Vgs - Vt) \cdot Vds = \frac{K \times W}{L} \cdot (Vgs - Vt) \cdot Vds \quad (2)$$

assuming that $K = \mu \times C_{ox}$.

Solving for the ON resistance, the following Equation (3) can be derived from Equation (2):

$$Ron = \frac{1}{\frac{\partial Ids}{\partial Vds}} = \frac{L}{\mu \cdot Cox \cdot W \cdot (Vgs - Vt)} = \frac{L}{K \cdot W \cdot (Vgs - Vt)} \quad (3)$$

As shown above in Condition 3, in the circuit in FIG. 14(A) with $V_{gs}$=5 V, $R_{ON}$ can be assumed to be 2 Ω. For ease of calculation, assuming that $V_t$=0 V, the following relationship is found by substituting these values in Equation (3):

$$Ron = \frac{L}{K \cdot W \cdot 5} = 2(\Omega) \quad (4)$$

By introducing Equation (4) into Equation (3), the relationship between $R_{ON}$ and $V_g$ for the MOSFET used in the embodiment in FIG. 14(A) is determined as follows:

$$Ron = \frac{10}{(Vgs - Vt)}(\Omega) \quad (5)$$

Figure 16:
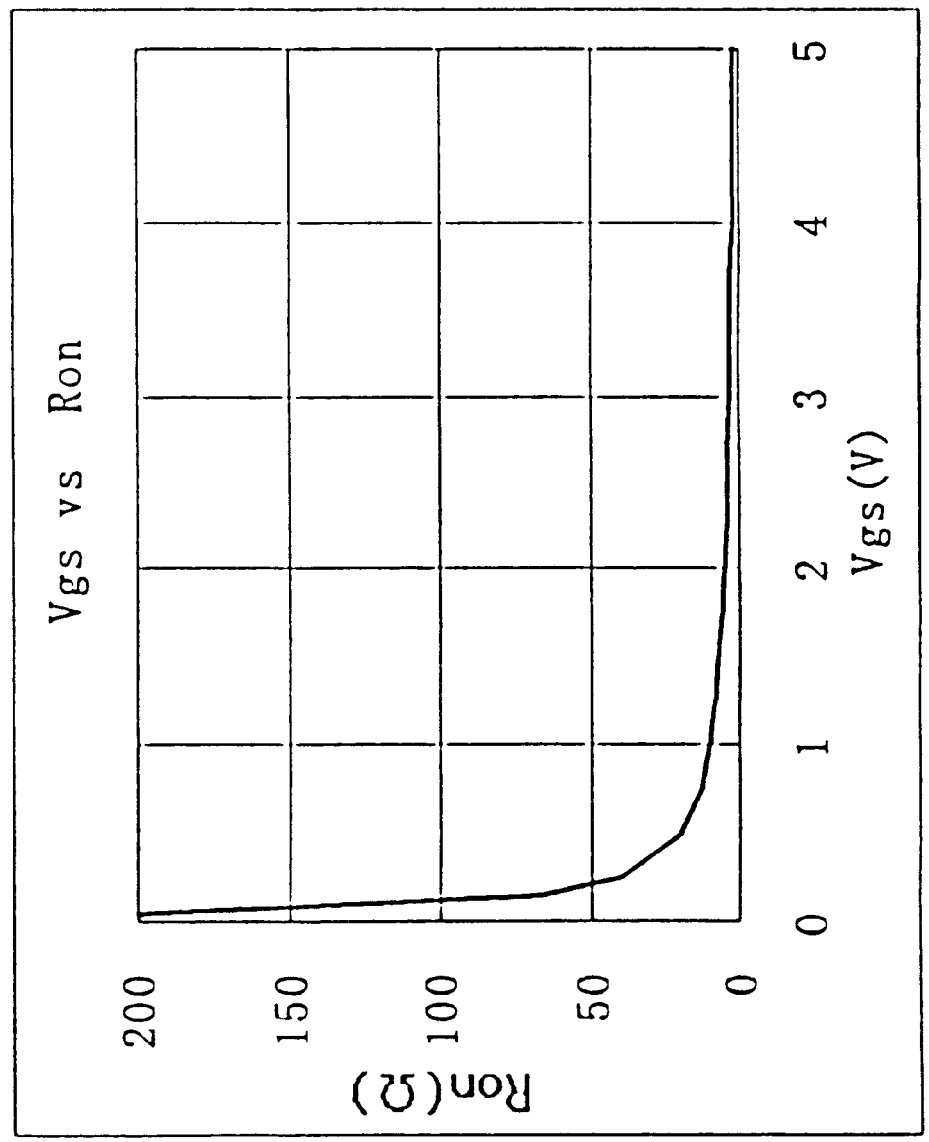
FIG. 16 is a graphical representation of the relationship between $V_{gs}$ and $R_{on}$ for a MOS transistor.

FIG. 16 shows Equation (5) in graphical form (assuming $V_t$=0). When $V_{gs}$ increases, $R_{ON}$ gradually decreases. Moreover, when $V_{gs}$ is in the vicinity of 0 (when it is close to $V_t$), the variation in the on resistance due to $V_{gs}$ is great. As a result, when the ramp waveform of FIG. 14(B) is applied to the gate of the MOSFET, the resistance of the MOS transistor can be varied with time.

Figures 17A, 17B:
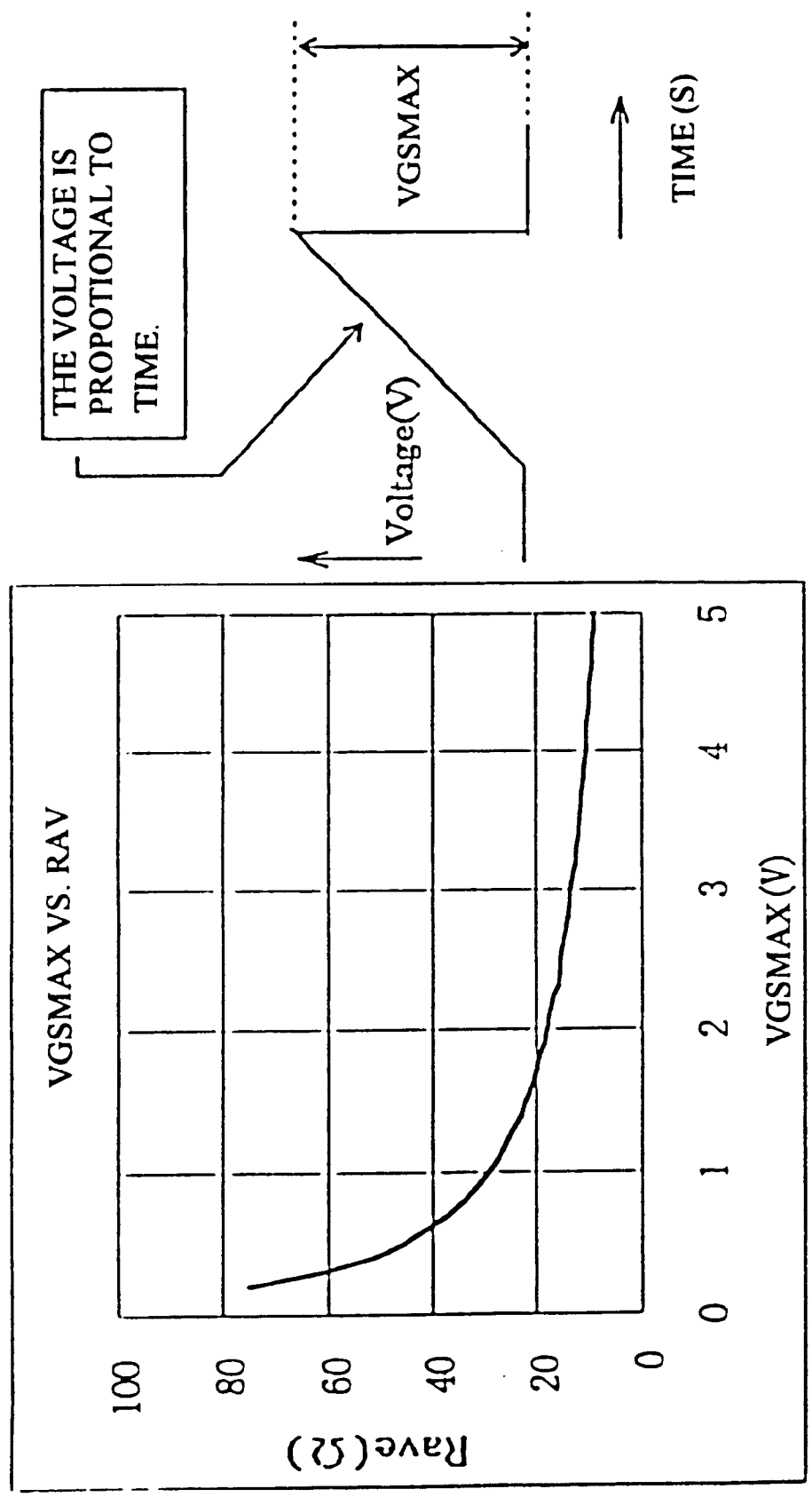
FIGS. 17(A) and B are graphical representation of the relationship between maximum power of the ramp waveform ($V_{gsmax}$) and average resistance ($R_{ave}$)

If the voltage of the ramp waveform as shown in FIG. 17(B) varies proportionally with respect to time, the resistance of the MOSFET over time can be expressed simply using Equation (5), so that it is possible to find the average resistance. FIG. 17(A) shows the results of such a calculation, the horizontal axis representing the maximum voltage ($V_{gsmax}$) of the ramp waveform, the vertical axis representing the average resistance ($R_{ave}$) per unit time. Of course, when the maximum voltage increases, the average resistance decreases. However, it can readily be seen that when the maximum voltage is low (when the pulse width is short), the average resistance is sufficiently high. For this reason, it is easier to control the output voltage using a ramp waveform than in the charge pump circuits described in connection with FIGS. 2, 3(A), 4(A), 6 and 9.

Figure 5:
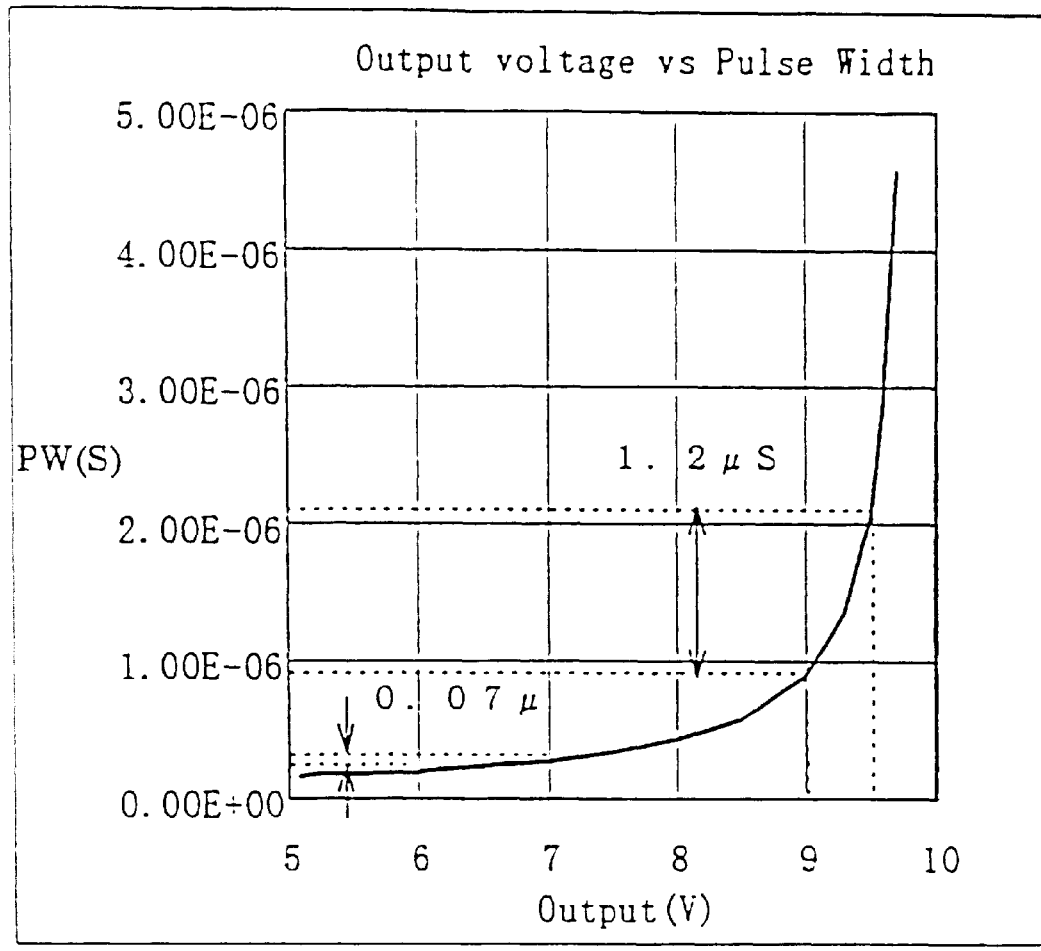
FIG. 5 is a graphical representation of the relationship between output voltage and pulse width in the simulation circuit shown in FIG. 4(A)
Figure 6:
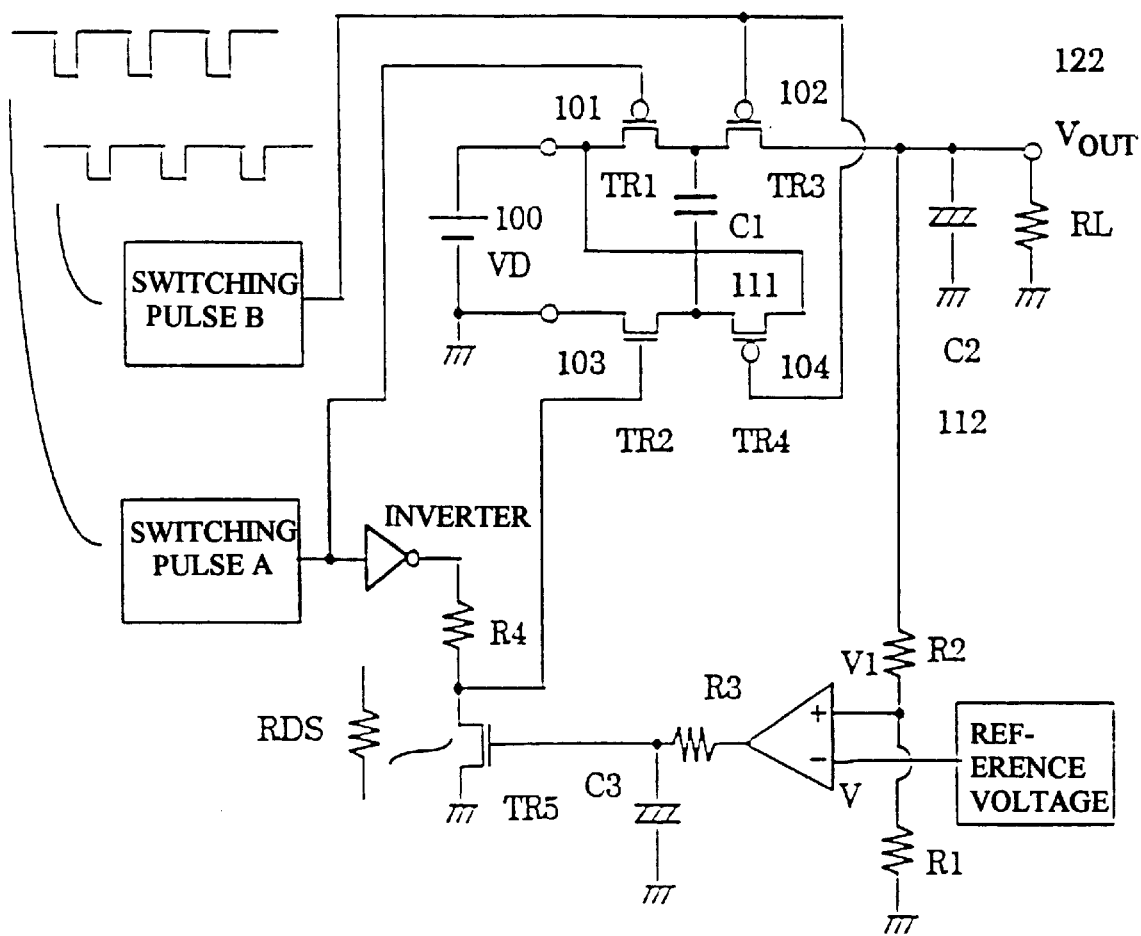
FIG. 6 is a schematic diagram of another charge pump circuit used to explain the drawbacks of the prior art.
Figure 7A:
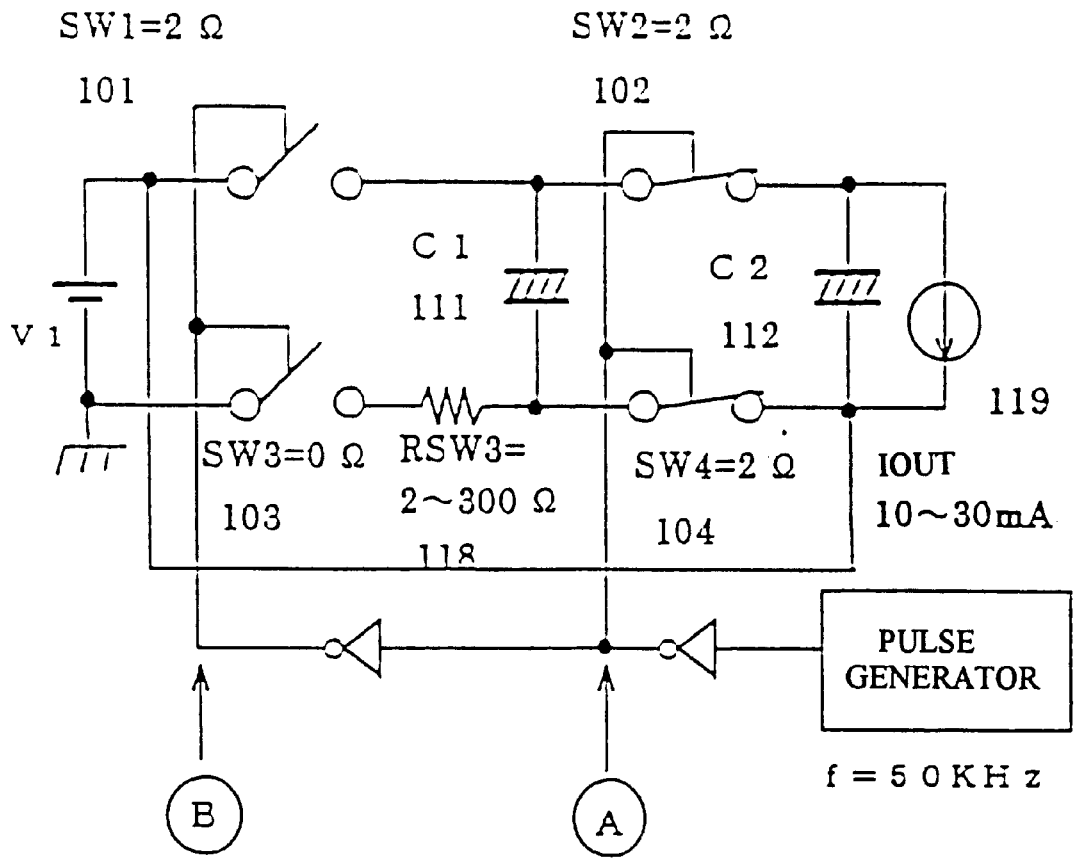
FIG. 7(A) is a schematic diagram of a simulation circuit used for analysis of the charge pump circuit of FIG. 6.
Figure 7B:
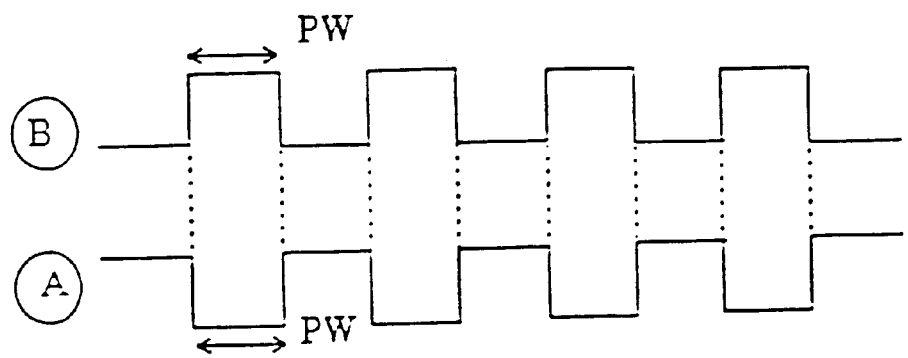
FIG. 7(B) is a graphical representation of waveforms appearing at various portions of the simulation circuit of FIG. 7(A)
Figure 8:
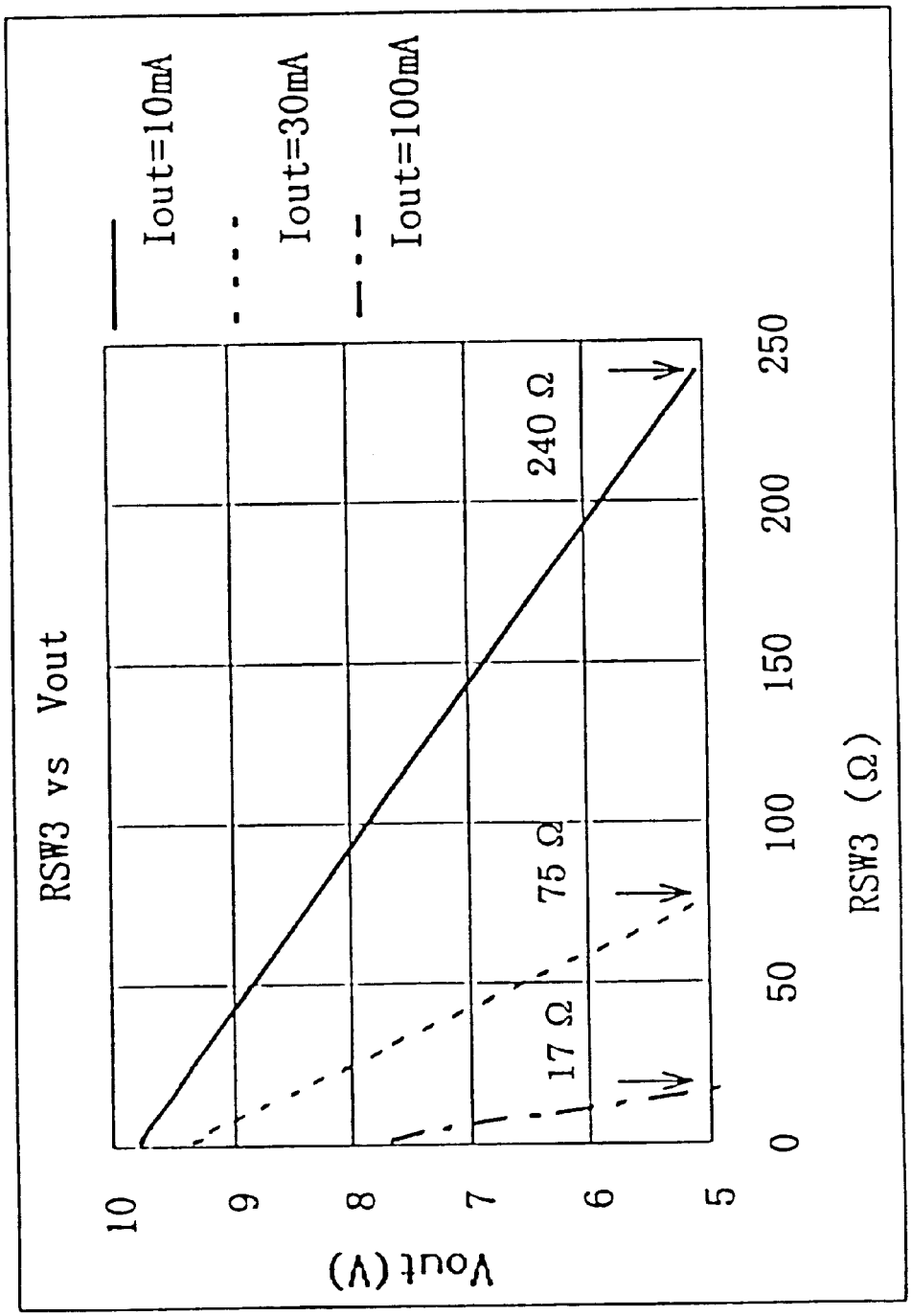
FIG. 8 is a graphical representation of the relationship between resistance and output voltage in the simulation circuit of FIG. 7(A)
Figure 9:
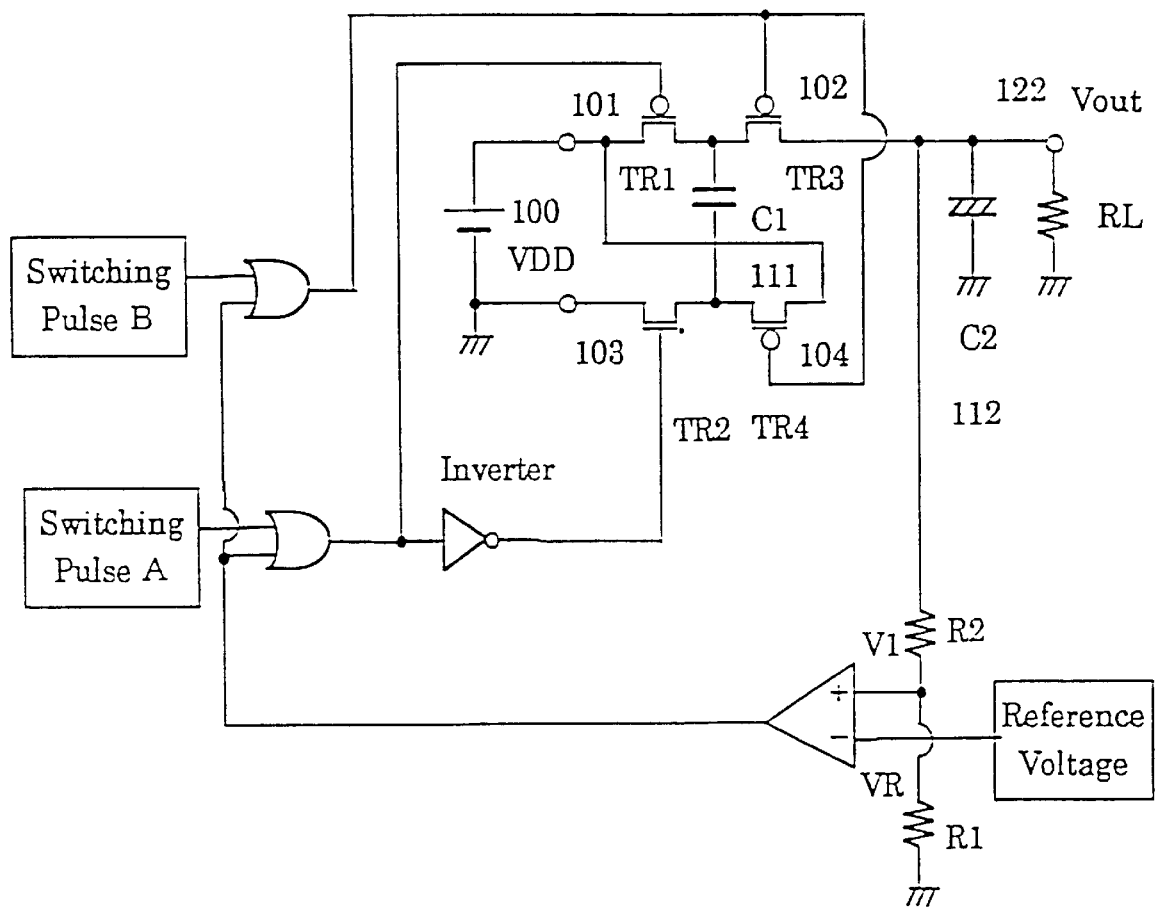
FIG. 9 is a schematic diagram of another charge pump circuit used to explain the drawbacks of the prior art.
Figure 19:
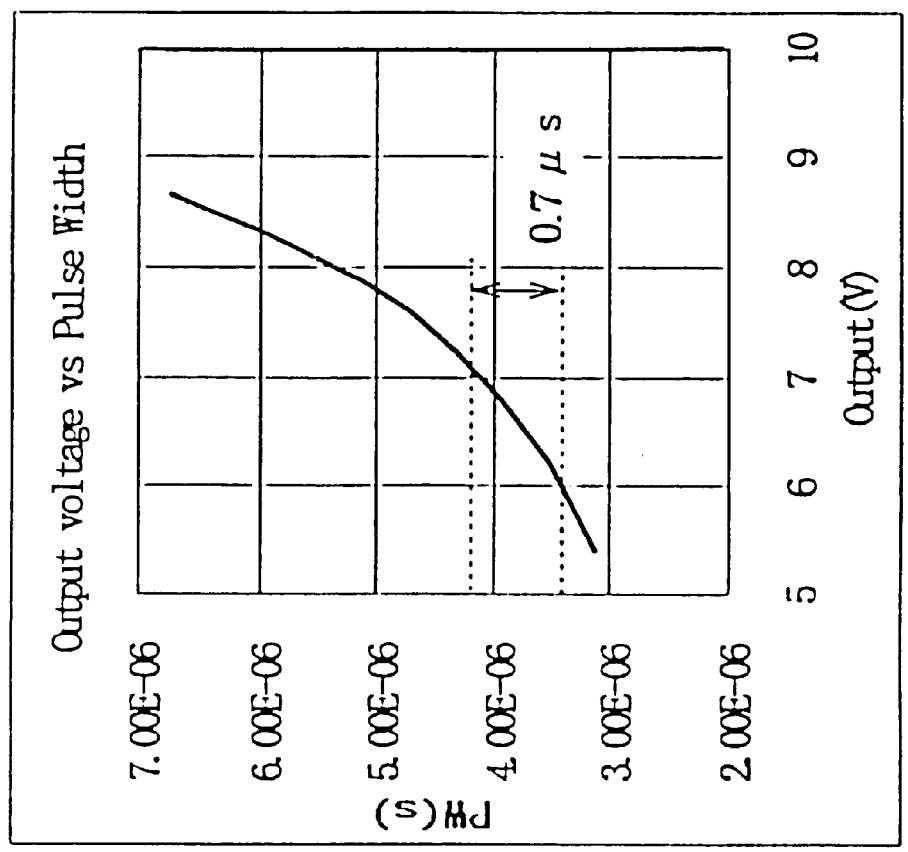
FIG. 19 is an enlarged diagram of a portion of FIG. 18.
Figure 18:
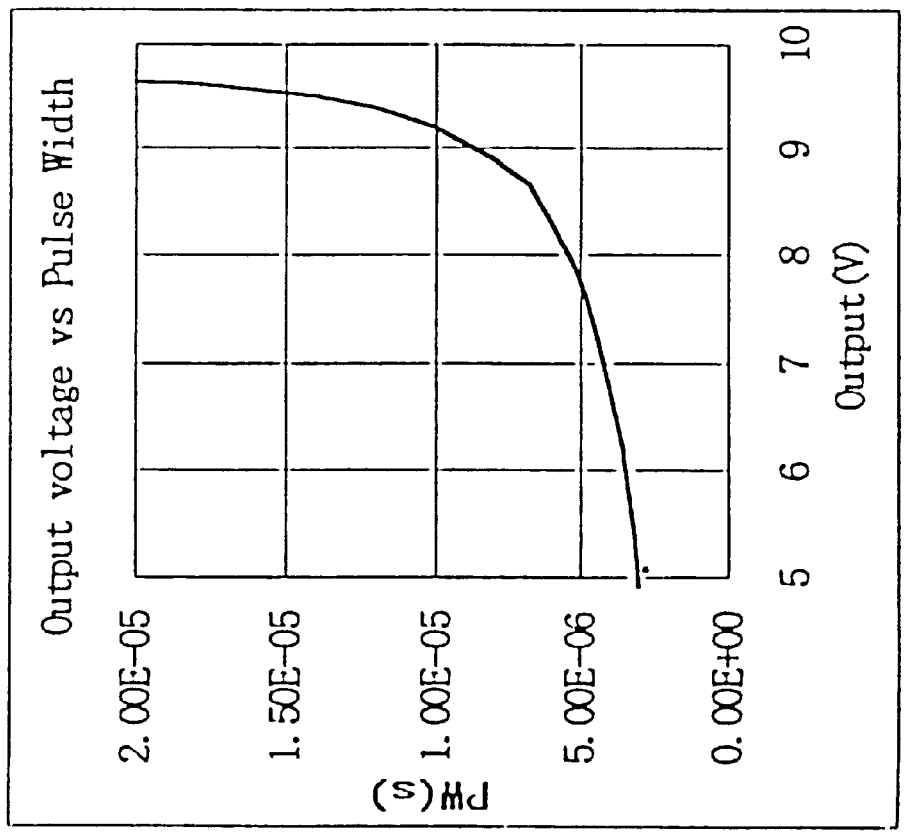
FIG. 18 is a graphical representation of the relationship between output voltage and pulse width.

Since the average resistance ($R_{ave}$) at the maximum voltage ($V_{gmax}$) varies with a ramp waveform, the pulse width (PW) and the average resistance ($R_{ave}$) can both be found in the same manner. This can be seen in FIG. 17 by substituting PW on the horizontal axis (not shown in the figure). Thus, the relationship between the pulse width and the maximum voltage of the ramp waveform in the circuit in FIG. 14 can be determined using a simulation, as shown in FIG. 18. When comparing this with the results of a simulation using the charge pump circuit of FIG. 5, the differences are clear. FIG. 19 shows an enlarged version of a portion of FIG. 18. When comparing this with the results of a simulation using the charge pump circuit shown in FIG. 5, the differences are even more evident. In order to vary the output voltage from 6 V to 7 V using the charge pump circuit of FIG. 5, the pulse width would need to be changed by only 70 ns. On the other hand, control is extremely easy in this embodiment since the pulse width must be changed by 700ns. Moreover, by lengthening the pulse width, the output voltage can easily be raised.

In order to reduce the output voltage, the ON-time of the switch is made shorter, and since the power loss in the resistor element is small, the input/output conversion efficiency is high.

In the embodiment of the invention shown in FIGS. 14(A) and (B), the pulse width of the rectangular waveform (the gate voltage waveform of the first, second and fourth switches (SW1,SW2,SW4) 101,102,104) was fixed, but this can also be varied so as to coincide with the ON time of the ramp waveform. As shown by the arrows in FIG. 20, the start-up and decay of the ramp waveform are synchronous with the rectangular waveform. The operation of the charge pump is completely identical with that explained above.

Figure 21:
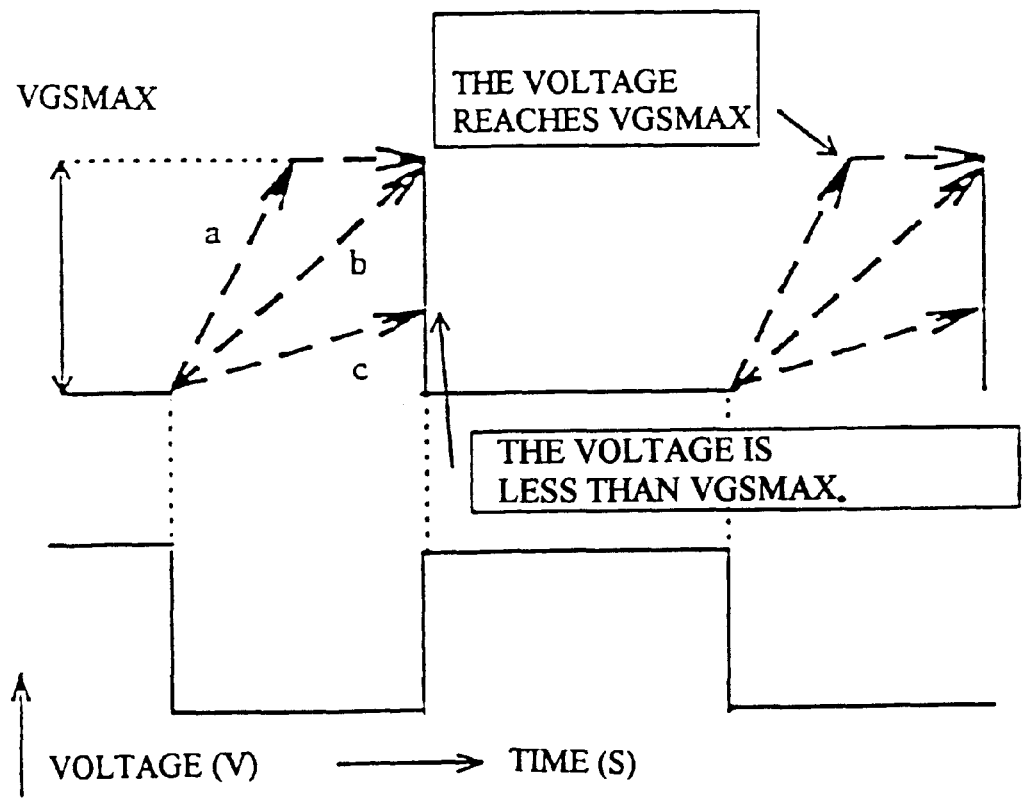
FIG. 21 is a graphical representation of a ramp waveform in accordance with another embodiment of the present invention.

FIG. 21 shows a different embodiment of the ramp waveform. By varying the ramp waveform as shown from a to c, it is possible to vary the output voltage. With waveform a, the start-up and decay of the output voltage are rapid, reaching maximum voltage in a specific time. Waveform b is similar to that described above. In comparison to waveform b, waveform a has a lower average resistance, and the voltage output from the charge pump circuit is high. When the output voltage is made low, if a ramp waveform such as waveform c is used, the average resistance is high and the output voltage is low, so it is possible to easily adjust the output voltage.

If a delay occurs at the start-up point of the pulse voltage of the switch control signal shown in the conventional examples, it may sometimes have a waveform like that of waveform a. However, such a delay is not deliberately or consistently produced on a controllable basis, and it cannot be recognized as the ramp waveform used in the present invention. The ramp waveform of the present invention is a waveform which has been designed deliberately to require time to elapse before the voltage reaches its peak.

Figure 22:
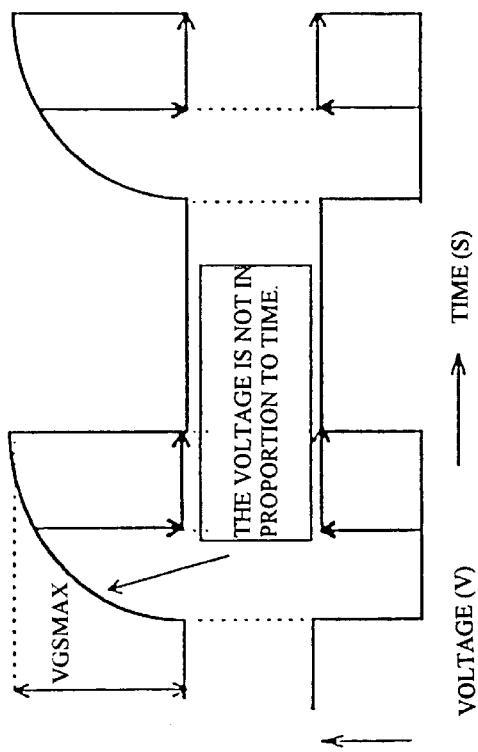
FIG. 22 is a graphical representation of a ramp waveform in accordance with another embodiment of the present invention.
Figure 23:
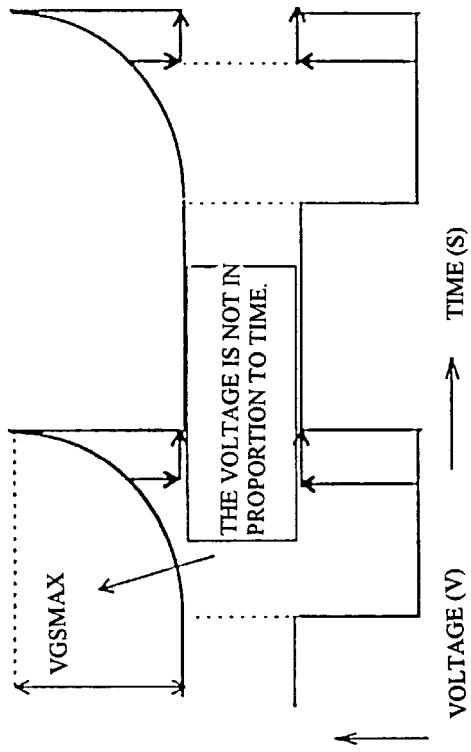
FIG. 23 is a graphical representation of a ramp waveform in accordance with still yet another embodiment of the present invention.

FIGS. 22 and 23 are further embodiments of ramp waveforms with which the invention may be practiced. With the ramp waveform of FIG. 22, when the pulse width reaches a maximum the average resistance is lower than that of FIG. 20. Thus, using this waveform, it is possible to obtain a large output current from the charge pump circuit. With the waveform of FIG. 23, when the pulse width is at a maximum the average resistance is low. On the other hand, when the output voltage is set low, the range of adjustment for the pulse width is wide.

In this manner, even if the output voltage does not have a waveform which varies proportionately with time, it is still possible to easily adjust the output voltage of the charge pump circuit. In other words, if the gate of the MOSFET used as a switch is driven using a voltage waveform in which the output voltage rises with time, adjustment of the output voltage can be easily carried out. When using a bipolar transistor as a switch, it will be sufficient if the base current rises together with time. If using a device in which the resistance varies with time, switches other than this type can also be used to realize the invention.

Figure 24:
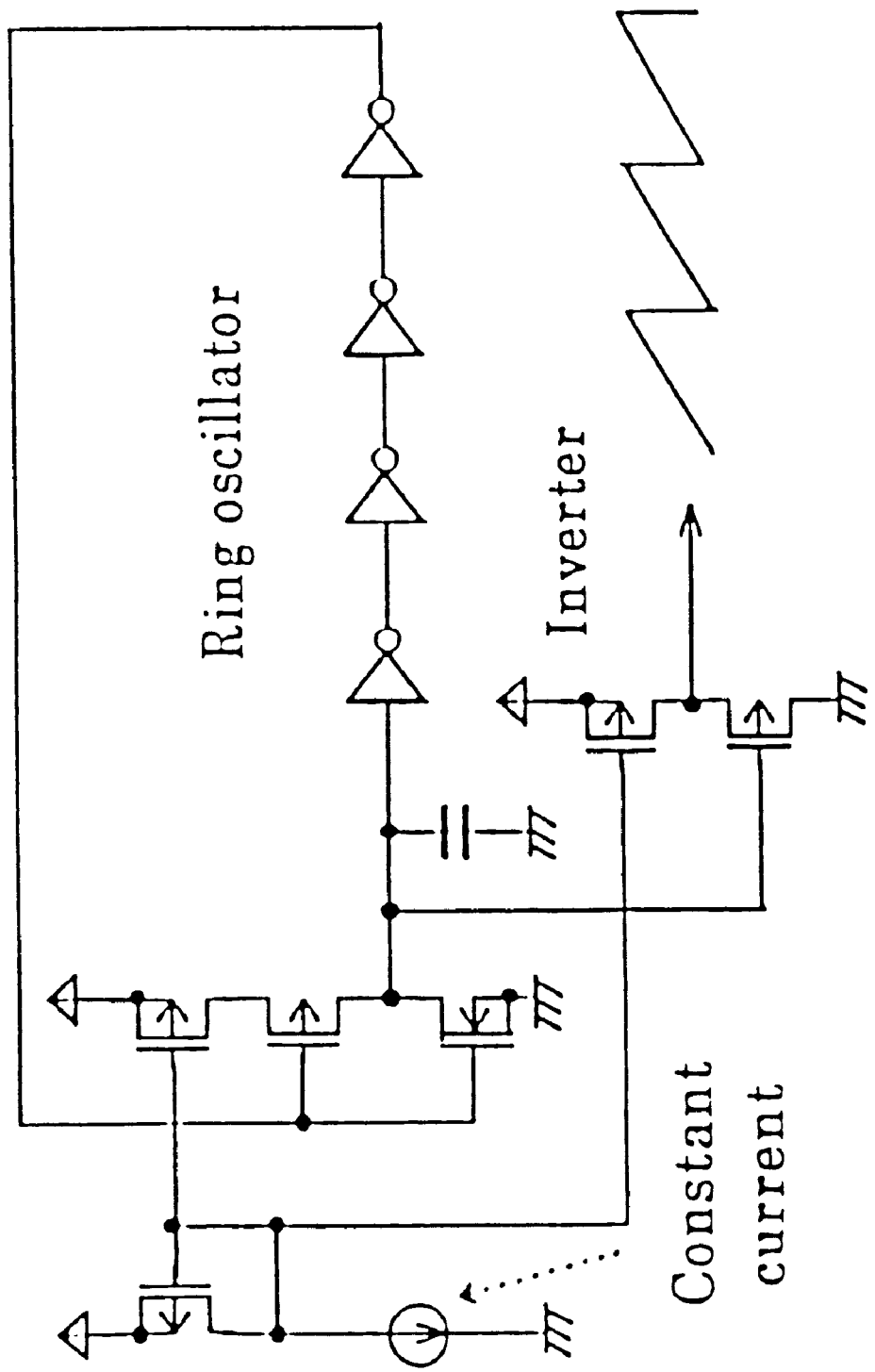
FIG. 24 is a schematic diagram of one embodiment of a ramp waveform generating circuit used in the charge pump circuit of the present invention.
Figure 25:
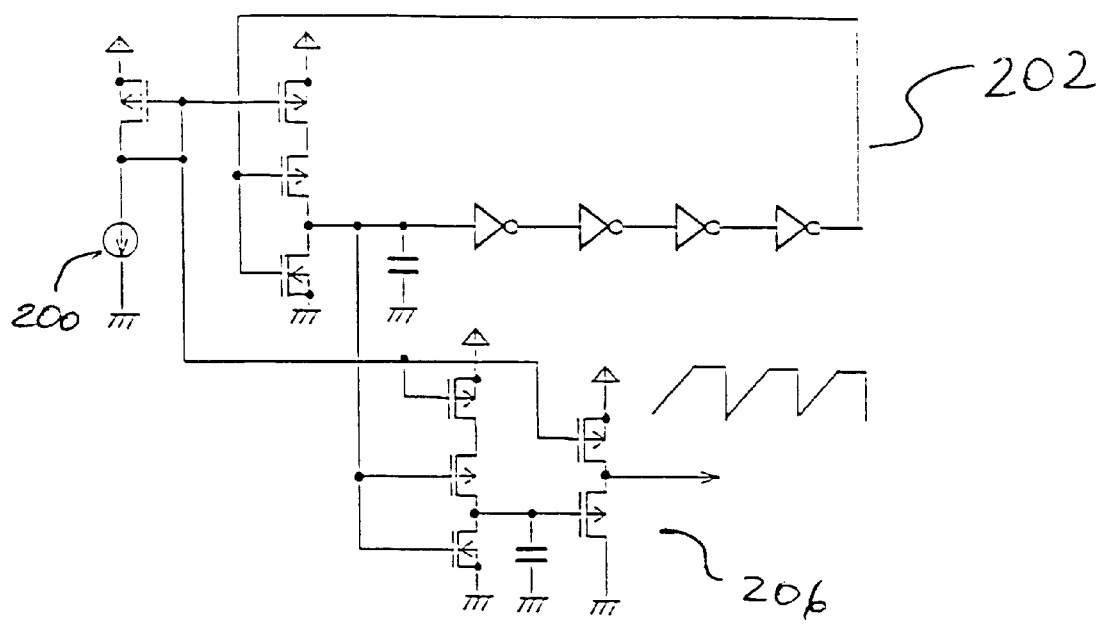
FIG. 25 is a schematic diagram of a second embodiment of a ramp waveform generating circuit used in the charge pump circuit of the present invention.

Furthermore, the ramp waveforms can be formed using a simple circuit. FIGS. 24 and 25 show circuits for generating ramp waveforms.

Figure 20:
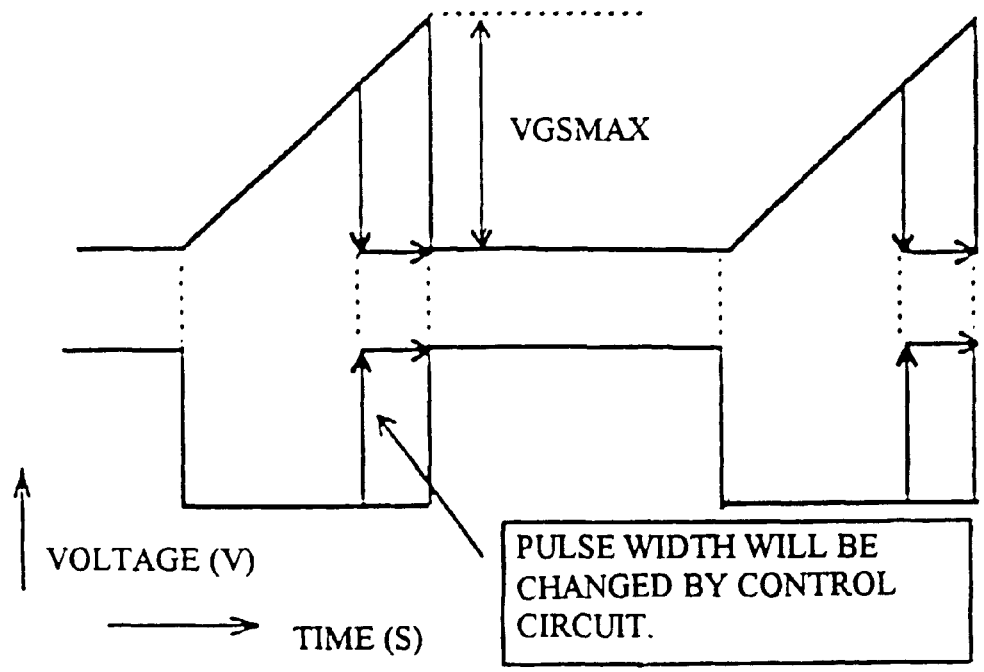
FIG. 20 is a graphical representation of a ramp waveform in accordance with one embodiment of the present invention.

In the embodiment of FIG. 24, the sawtooth waveform shown in FIG. 20 can be created simply using only a low power constant current source 200, a ring oscillator 202, and an inverter 204. This is similar to the oscillators in conventional use, and the scale of the circuit is not large. In addition, the manufacturing cost of such a circuit is negligible. Furthermore, there is no need to generate an extremely short pulse width, so that current consumption is low. In the embodiment in FIG. 25, the waveform shown in FIG. 21 can be achieved using only a low power constant current source 200, a ring oscillator 202, and an inverter 206, in the same way as for the circuit in FIG. 24. This also is not expensive to manufacture, and does not consume much current.

As described above, in accordance with the present invention, the need for a complicated circuit or for increased current consumption is obviated by the use of an adjustable ramp waveform for driving a switching element used in charge transfer to control the output voltage. Moreover, the ramp waveform can be created using a simple circuit.

In the above-described embodiments, the output voltage is adjusted by applying a ramp waveform applied to the third switch (SW3) 103. However, it will be appreciated that the output voltage can be adjusted by applying the ramp waveform to one (or more) of the other switches in a similar manner.

This will be explained with reference to the circuit diagram of FIG. 10. In the circuits described up to this point, the ramp waveform has been applied to control terminal 134 in FIG. 10. If the ramp waveform is applied to control terminal 132 only, it is still possible to adjust the electric charge transferred to the pump capacitor (C1) 111 from the external power source ($V_{DD}$) 100. As this can be easily understood, a detailed explanation will be omitted. Moreover, the same result will be obtained if the ramp waveform is applied simultaneously to control terminals 132 and 134.

Even if the resistance of the switch transferring the load from the pump capacitor (C1) 111 to the output capacitor (C2) 112 is controlled using the ramp waveform, it is possible to vary the output power source. In other words, it is possible to apply the ramp waveform to control terminals 133 or 135 separately and adjust the load transferred from the pump capacitor (C1) 111 to the output capacitor (C2) 112. Moreover, even if the ramp waveform is applied simultaneously to control terminals 133 and 135, it is clear that the output power source can be adjusted.

In accordance with the present invention, as explained above, a charge pump circuit is driven using a method which controls the average resistance of one or more switching devices with a ramp waveform, and, when the output voltage fluctuates, the output voltage is maintained at a fixed value by varying the resistance of the switch circuit using the operation of a feedback circuit or the like.

Moreover, the size of the circuit used to achieve this result is small, the current consumed is low, and it is possible to control the output voltage easily without requiring high speed operation.

Furthermore, the input/output efficiency is high, the output ripple noise is low, and there is no radio frequency noise, with the result that the charge pump circuit of the present invention can be widely used as a power source device in many types of portable electronic equipment.

We claim:

1. A charge pump circuit comprising: an input terminal receptive of a power source voltage; one or more first capacitors having a capacitance value sufficient to permit charging to the power source voltage level; first and second switch elements connected to the one or more first capacitors and the input terminal; one or more second capacitors to which a charge can be transferred from the one or more first capacitors; third and fourth switch elements connected to the first and second capacitors; and a control circuit for controlling the first and second switch elements to transfer a charge from the input terminal to charge the one or more first capacitors and for controlling the third and fourth switch elements to transfer a charge from the one or more first capacitors to the one or more second capacitors; wherein at least one of the first through fourth switch elements has a variable ON resistance and is receptive of a time-varying signal comprising successive pulses each having a time-varying amplitude for varying the ON resistance of the at least one switch element during the application of each pulse to thereby control an output voltage of the one or more second capacitors.

2. A charge pump circuit according to claim 1; wherein the at least one switch element having a variable ON resistance comprises a MOS transistor and the time-varying signal is applied to a gate electrode thereof.

3. A charge pump circuit according to claim 1; wherein the at least one switch element having a variable ON resistance comprises a bipolar transistor and the time-varying signal is applied to a base electrode thereof so as to produce a time-varying base current in the bipolar transistor.

4. A charge pump circuit according to claim 1; wherein the successive pulses of the time-varying signal have a voltage that varies with time so as to control the charging of at least one of the at least one first capacitor and the at least one second capacitor.

5. A charge pump circuit according to claim 4; wherein the successive pulses of the time-varying signal each comprise a ramp pulse.

6. A charge pump switch group comprising: an input terminal for receiving a first voltage; an output terminal for outputting a second voltage; a plurality of semiconductor switch elements for transferring a charge from the input terminal to the output terminal; and one or more capacitors connected to selected ones of the one or more semiconductor switch elements for receiving the transferred charge; wherein at least one of the semiconductor switch elements has a variable ON resistance and is receptive of a time-varying signal comprising successive pulses each having a time-varying amplitude so as to vary the ON resistance of the at least one semiconductor switch element to control the charging of the one or more capacitors and to thereby control the second voltage.

7. A charge pump switch group according to claim 6; wherein the one or more capacitors comprises first and second capacitors; and the plurality of semiconductor switch elements comprises first and second semiconductor switch elements connected to the input terminal and the first capacitor for transferring a charge from the input terminal to the first capacitor, and third and fourth semiconductor switch elements connected to the first capacitor and the second capacitor for transferring a charge from the first capacitor to the second capacitor.

8. A charge pump switch group according to claim 6; wherein the one or more capacitors comprises first, second and third capacitors; and the plurality of semiconductor switch elements comprises first and second semiconductor switch elements connected to the input terminal and the first capacitor for transferring a charge from the input terminal to the first capacitor, third and fourth semiconductor switch elements connected to the input terminal and the second capacitor for transferring a charge from the input terminal to the second capacitor, and fifth and sixth semiconductor switch elements connected to the first capacitor and the second capacitor for transferring a charge from the first capacitor to the second capacitor.

9. A charge pump switch group according to claim 6; wherein the at least one semiconductor switch element having a variable ON resistance comprises a MOS transistor and the time-varying signal is applied to a gate electrode thereof.

10. A charge pump switch group according to claim 6; wherein the at least one semiconductor switch element having a variable ON resistance comprises a bipolar transistor and the time-varying signal is applied to a base electrode thereof so as to produce a time-varying base current in the bipolar transistor.

11. A charge pump switch group according to claim 6; wherein the successive pulses of the time-varying signal each have a voltage that varies with time so as to control the charging level of the at least one capacitor.

12. A charge pump circuit according to claim 11; wherein the successive pulses of the time-varying signal each comprise a ramp pulse.

* * * * *